US011956190B2

(12) United States Patent
Lo et al.

(10) Patent No.: US 11,956,190 B2
(45) Date of Patent: Apr. 9, 2024

(54) MESSAGING SYSTEM WITH A CAROUSEL OF RELATED ENTITIES

(71) Applicant: Snap Inc., Santa Monica, CA (US)

(72) Inventors: Benjamin Lo, Los Angeles, CA (US); Celia Nicole Mourkogiannis, Los Angeles, CA (US); Ibrahem Shekoni, Santa Monica, CA (US); Yamill Vallecillo, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/018,670

(22) Filed: Sep. 11, 2020

(65) Prior Publication Data

US 2021/0352029 A1 Nov. 11, 2021

Related U.S. Application Data

(60) Provisional application No. 63/022,204, filed on May 8, 2020.

(51) Int. Cl.
*H04L 51/046* (2022.01)
*G06F 3/0482* (2013.01)
(Continued)

(52) U.S. Cl.
CPC .......... *H04L 51/046* (2013.01); *G06F 3/0482* (2013.01); *G06F 3/0485* (2013.01); *G06F 16/248* (2019.01)

(58) Field of Classification Search
CPC ... H04L 51/046; G06F 16/248; G06F 3/0482; G06F 3/0485
See application file for complete search history.

(56) References Cited

U.S. PATENT DOCUMENTS

| 5,880,731 A | 3/1999 | Liles et al. |
| 6,023,270 A | 2/2000 | Brush et al. |

(Continued)

FOREIGN PATENT DOCUMENTS

| CN | 109863532 A | 6/2019 |
| CN | 110168478 A | 8/2019 |

(Continued)

OTHER PUBLICATIONS

"International Application Serial No. PCT/US2021/031102, International Search Report dated Aug. 18, 2021", 3 pgs.

(Continued)

*Primary Examiner* — Mahelet Shiberou
(74) *Attorney, Agent, or Firm* — Schwegman Lundberg & Woessner, P.A.

(57) ABSTRACT

A carousel module that enables a user of an application to access related entities which may be friends where the friends are friends to the user within a messaging system. The carousel module accesses profile information of the friends from the messaging system and makes the profile information available within the application. The carousel module provides new functions related to friends for the user within the application. Methods include a carousel module accessing from a messaging system a list of friends of a user of an application, the list of friends indicating friends of a user within the messaging system. The methods include causing a carousel to be displayed for the user on a computing device and causing a status within the application of the friends of the carousel to be displayed on the computing device.

18 Claims, 23 Drawing Sheets

(51) Int. Cl.
   *G06F 3/0485* (2022.01)
   *G06F 16/248* (2019.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van Luchene et al. |
| 7,819,749 B1 | 10/2010 | Fish et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,244,672 B1* | 8/2012 | Thenthiruperai ....... H04W 4/50 707/621 |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,195,969 B2* | 11/2015 | Bau ....................... G06F 3/0481 |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,324,043 B2* | 4/2016 | O'Sullivan .......... G06Q 10/025 |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,731,203 B2* | 8/2017 | Craine ................... A63F 13/48 |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,881,295 B1* | 1/2018 | Buddhavarapu ........................... G06Q 20/40145 |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Chariton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 11,095,724 B2* | 8/2021 | Fisher ................... A63F 13/48 |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0250585 A1* | 10/2007 | Ly ......................... G06F 16/951 707/E17.108 |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0163574 A1* | 6/2012 | Gundotra ............... G06Q 50/01 379/114.03 |
| 2013/0103760 A1 | 4/2013 | Golding et al. |
| 2013/0111366 A1* | 5/2013 | Silbey ................... A63F 13/795 715/757 |
| 2013/0201187 A1 | 8/2013 | Tong et al. |
| 2013/0249948 A1 | 9/2013 | Reitan |
| 2013/0257877 A1 | 10/2013 | Davis |

(56) References Cited

U.S. PATENT DOCUMENTS

| | | |
|---|---|---|
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0244630 A1* | 8/2014 | Kuramura ............... G06Q 50/01 707/723 |
| 2015/0206349 A1 | 7/2015 | Rosenthal et al. |
| 2016/0021179 A1* | 1/2016 | James ..................... G06Q 10/10 709/204 |
| 2016/0050165 A1* | 2/2016 | Thomas .................. G06Q 50/01 715/752 |
| 2016/0057099 A1 | 2/2016 | Strope et al. |
| 2016/0134840 A1 | 5/2016 | Mcculloch |
| 2016/0148126 A1* | 5/2016 | Paleja .................. G06F 3/04855 705/5 |
| 2016/0234149 A1 | 8/2016 | Tsuda et al. |
| 2016/0279523 A1 | 9/2016 | Altagar et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0290053 A1* | 10/2018 | Zhang ..................... H04L 67/38 |
| 2018/0300917 A1 | 10/2018 | Barnett et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0073833 A1* | 3/2019 | Altieri .................... A63F 13/216 |
| 2019/0188920 A1 | 6/2019 | Mcphee et al. |
| 2021/0076099 A1* | 3/2021 | Ganschow ............. G06F 21/44 |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"International Application Serial No. PCT/US2021/031102, Written Opinion dated Aug. 18, 2021", 5 pgs.

"International Application Serial No. PCT/US2021/031102, International Preliminary Report on Patentability dated Nov. 17, 2022", 7 pgs.

* cited by examiner

2300

```
┌─────────────────────────────────────────────────────────────┐
│ A FRIENDS CAROUSEL MODULE, USING AT LEAST ONE PROCESSOR,    │
│ ACCESSING A LIST OF FRIENDS OF A USER OF AN APPLICATION,    │
│ THE LIST OF FRIENDS INDICATING FRIENDS OF THE USER WITHIN   │
│ A MESSAGING SYSTEM, WHERE THE FRIENDS LIST IS ORDERED       │
│ BASED ON INTERACTIONS OF THE FRIENDS OF THE LIST OF         │
│ FRIENDS WITH THE USER WITHIN THE MESSAGING SYSTEM           │
│                          2302                                │
└─────────────────────────────────────────────────────────────┘
                              │
                              ▼
┌─────────────────────────────────────────────────────────────┐
│ CAUSING A CAROUSEL OF FRIENDS OF THE LIST OF FRIENDS TO BE  │
│ DISPLAYED FOR THE USER ON A COMPUTING DEVICE, THE CAROUSEL  │
│ OF FRIENDS BEING SCROLLABLE                                  │
│                          2304                                │
└─────────────────────────────────────────────────────────────┘
                              │
                              ▼
┌─────────────────────────────────────────────────────────────┐
│ CAUSING A STATUS WITHIN THE APPLICATION OF THE FRIENDS OF   │
│ THE CAROUSEL OF FRIENDS TO BE DISPLAYED ON THE COMPUTING    │
│ DEVICE                                                       │
│                          2306                                │
└─────────────────────────────────────────────────────────────┘
```

FIG. 23

MESSAGING SYSTEM WITH A CAROUSEL OF RELATED ENTITIES

CLAIM OF PRIORITY

This application claims the benefit of priority to U.S. Provisional Application Ser. No. 63/022,204, filed on May 8, 2020, which is incorporated herein by reference in its entirety.

TECHNICAL FIELD

Embodiments of the present disclosure generally relate to providing access to related entities (e.g., friends), as stored within a messaging system, within other applications. More particularly, but not by way of limitation, embodiments of the present disclosure relate to providing a carousel of related entities such as friends within other applications where a user of the other applications can access functions of the messaging system with regards to the related entities or friends and where information related to the related entities or friends within the messaging system is available to the other applications.

BACKGROUND

Many applications are available on mobile devices, and the applications may provide for communicating with related entities (e.g., friends) within the application. The application may be a multi-user application such as a game. However, often users of applications are friends within a messaging system. The messaging system may provide avatars and nicknames for their friends and the friends may want to communicate with their friends using the messaging system rather than the application while using the application. Users of the applications may not even recognize that they are playing with friends of theirs within the messaging system.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which:

FIG. 23 illustrates a method for a carousel of friends, in accordance with some examples.

DETAILED DESCRIPTION

Figure 1:
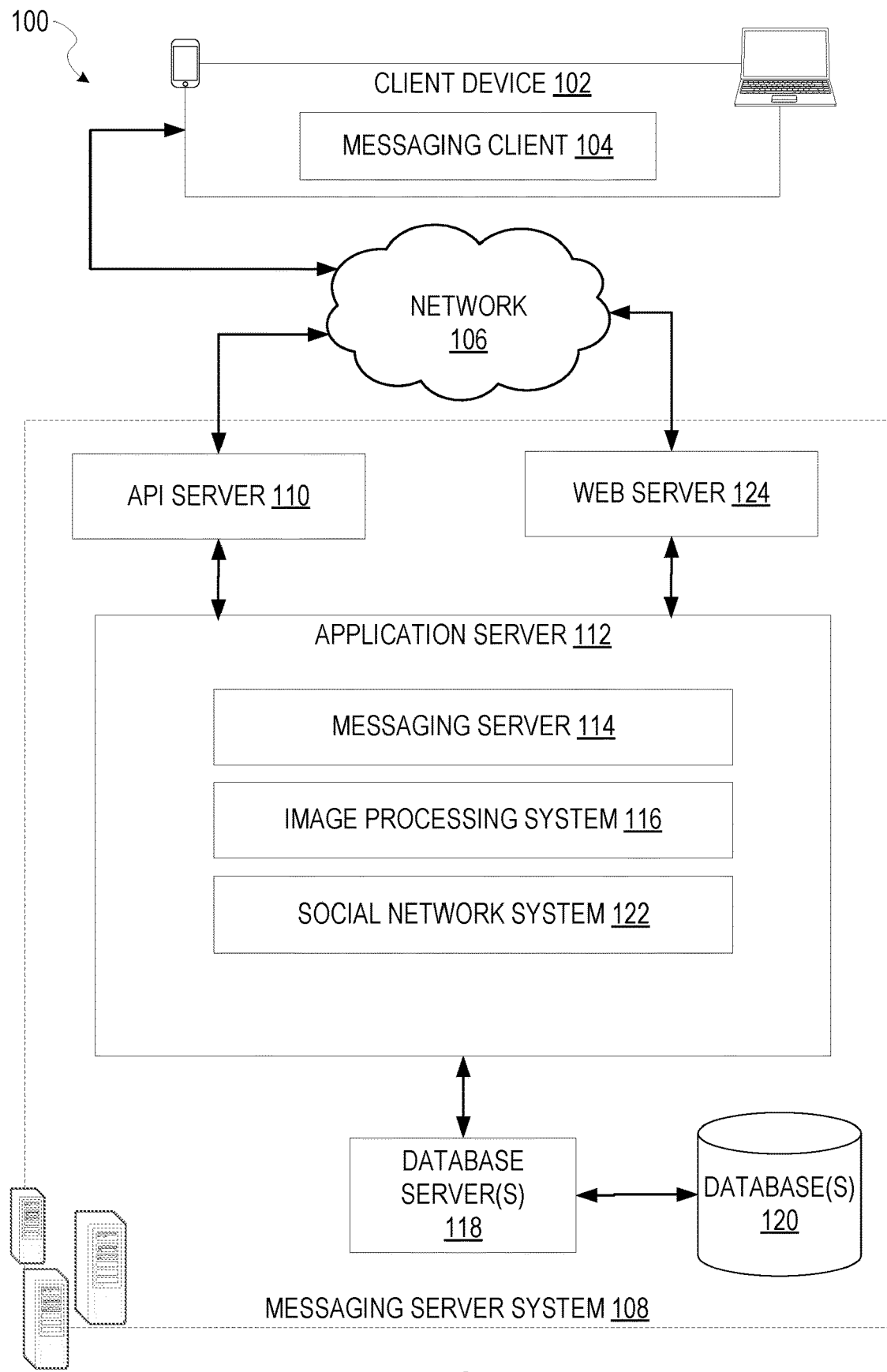
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Disclosed is a carousel application or module that provides access to related entities (e.g., friends) within a messaging system to other applications. While reference is made to "friends" within some examples discussed herein, it will be appreciated that these "friends" are specific examples of related entities, details of which are stored in an entity table 304, discussed with reference to FIG. 3, the entity table 304 being referentially linked to an entity graph 306. The nodes of the entity graph represent entities, and the links of the entity graph 306 represent any one of a number of relationships between the linked or related entities. Examples of these relationships include a social friendship, a working relationship, a family relationship, or membership of a common organization.

Users of the applications can send messages to their friends using the messaging system while using the other applications. Additionally, the carousel application provides information about their friends to the application so that the application can display their friends using avatar data from the messaging system and nicknames from the messaging system. The users of the other applications are more likely to use the other applications because of the familiarity of seeing their friends with the same avatars and nicknames that are used within the messaging system. Moreover, the carousel application enables the users of the other applications to send messages to one another within the other applications.

Additionally, the carousel application provides functionality within the other applications, such as enabling a user to see the status of their friends and to invite their friends to participate in the application with them. The other applications may have separate friends functions and may have separate status information available, which may not enable users of the application to even identify who their friends are within the messaging system.

The carousel of friends may be ordered based on interactions among the friends within the messaging system and based on factors relevant to the other applications. For example, in a multiplayer game, a best friend within a messaging system may be included in the carousel of friends but not listed first if the best friend is not able to immediately aid his friend within the multiplayer game.

Some examples provide the advantage of making applications easier to learn by enabling users of the application to invite and message friends from a messaging system while using the application. Some examples provide the advantage of lowering the barrier for people to use a new application by enabling new users to message and identify friends from a messaging system. Some examples provide the advantage of providing many functions related to messaging friends within the context of an application where the friends are friends from the messaging system.

Some examples provide a technical solution to the technical problem of providing access within an application to information from a messaging system. Some examples provide a technical solution to the technical problem of providing functionality of a messaging system within another application. Some examples provide a technical solution to the technical problem of providing identifying information of friends within an application by retrieving the identifying information from a messaging system and rendering the friends with information from both the application and the messaging system.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
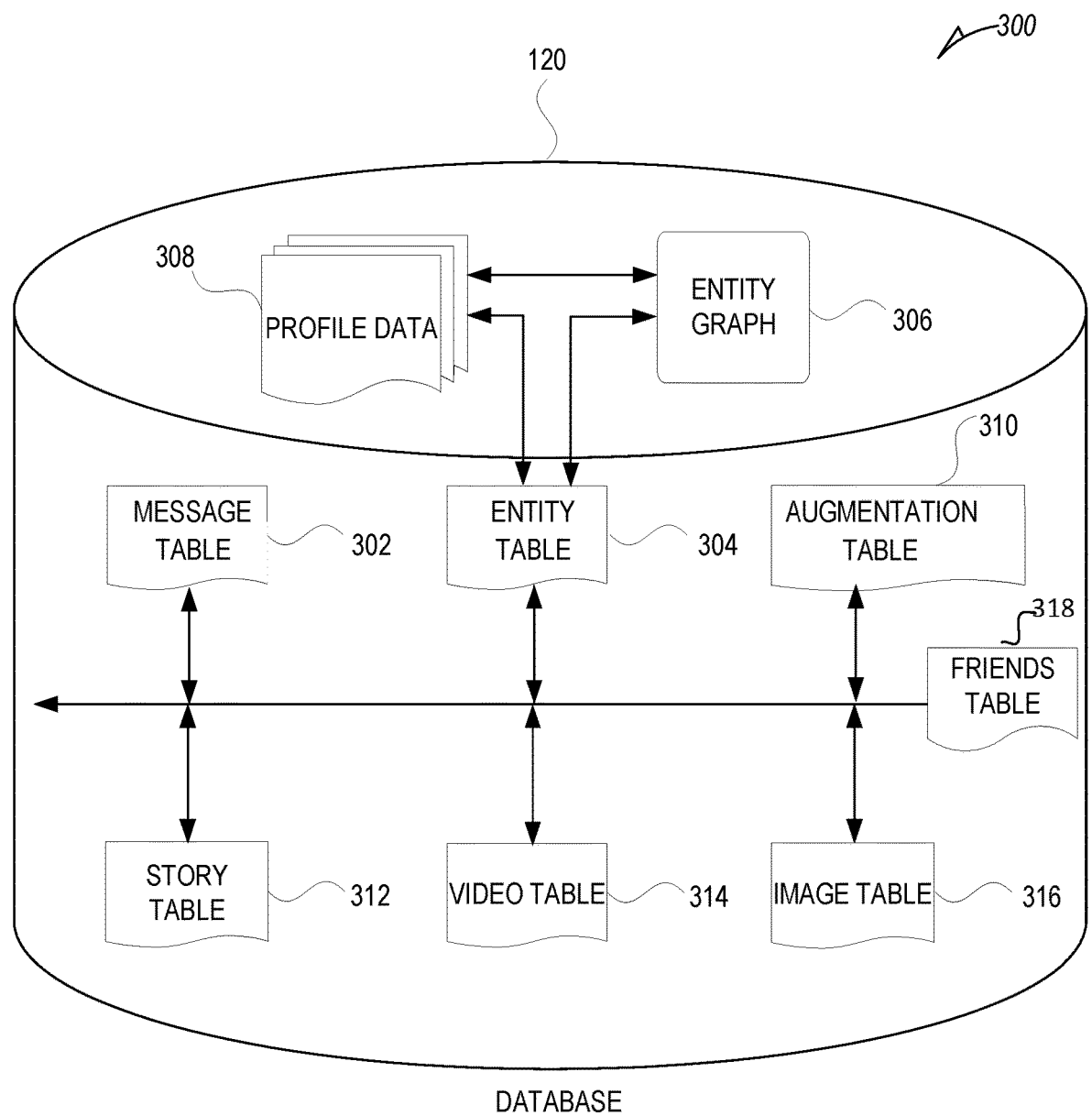
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
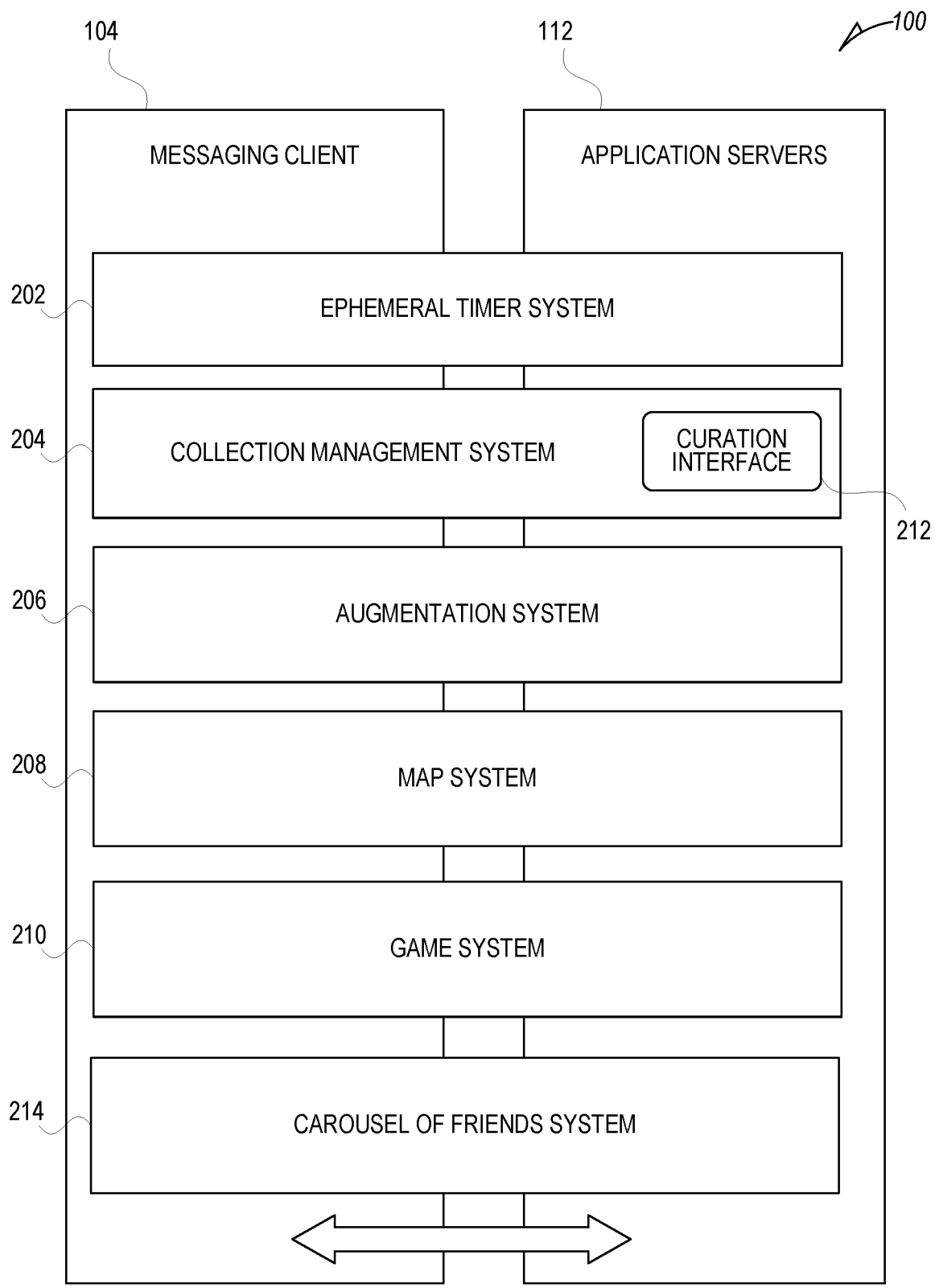
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the sever-side by the application servers 112. These subsystems include, for example, an ephemeral timer system 202, a collection management system 204, an augmentation system 206, a map system 208, a game system 210, and a carousel system 214. The carousel system 214 may be the same or similar as the carousel of carousel module 904 as disclosed in conjunction with FIG. 9.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

Figure 9:
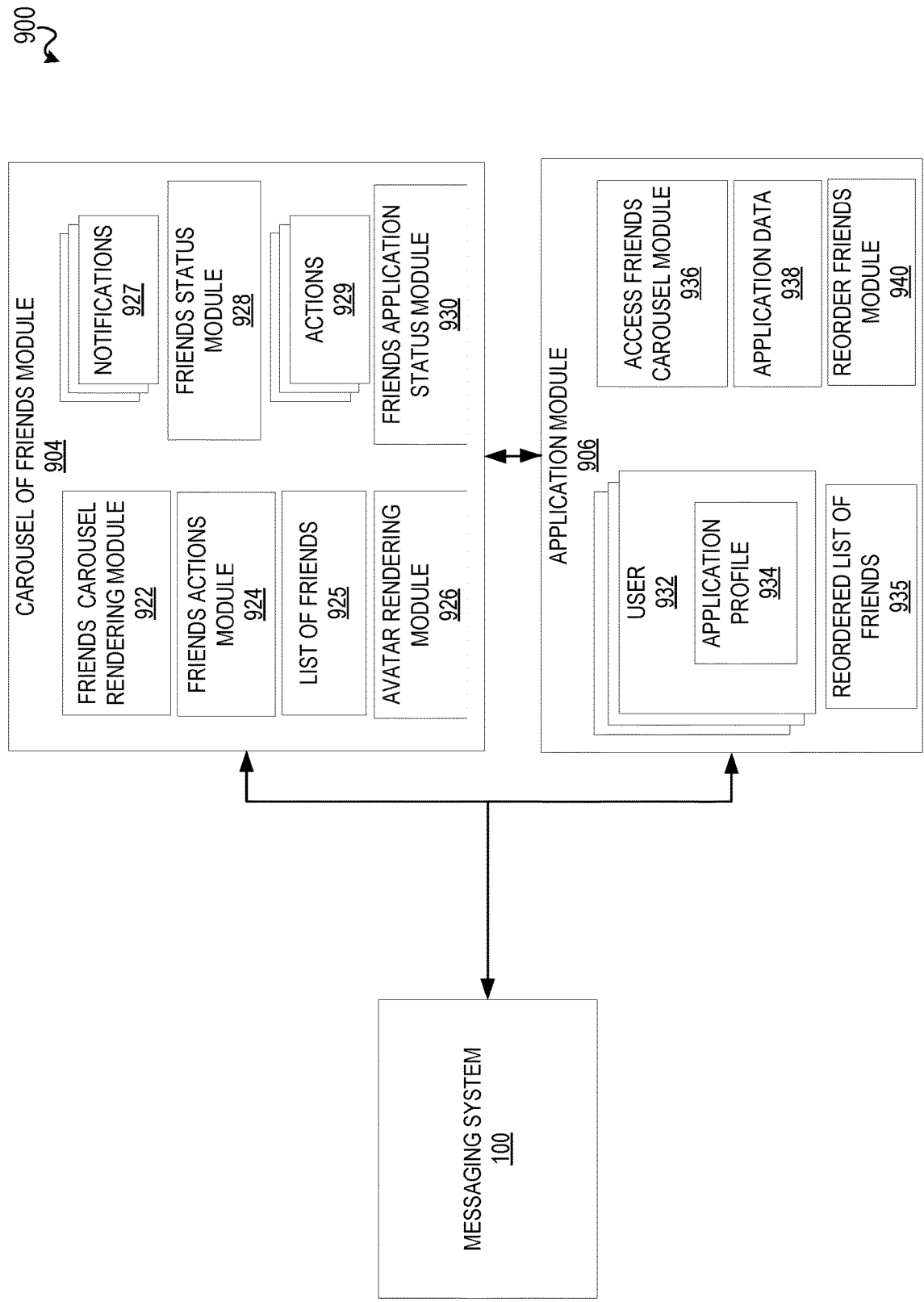
FIG. 9 illustrates a carousel system, in accordance with some examples.

The carousel system 214 provides various functions related to providing information and functions from the messaging system 100 to another application. The application may be a third-party application 740. The carousel system 214 provides a list of friends from the entity table 304 to the third-party application. The carousel system 214 provides information for displaying friends and for naming friends. The carousel system 214 provides messaging functionality to the users of the other application so that the users may communicate using the messaging system 100 while within the other application. The carousel system 214 provides status information regarding friends of a user of the other application. The user of the other application may be able to perform functions such as message a friend to come and join them in participating in a multiplayer application. FIG. 9 provides an overview of the carousel system 214.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging client 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Figure 10:
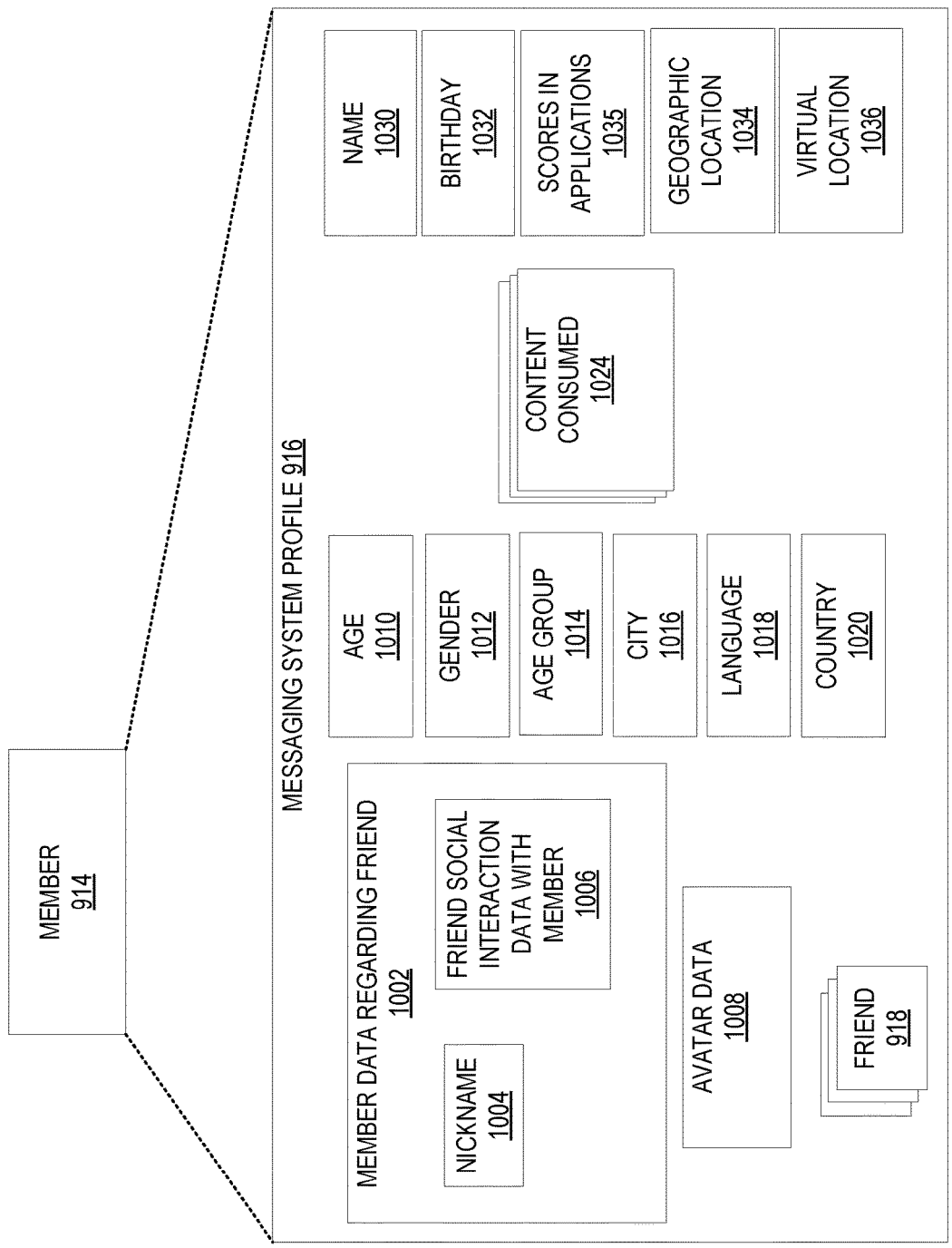
FIG. 10 illustrates messaging system profile, in accordance with some examples.

The database 120 can also store, referring to FIGS. 3, 9, and 10, information regarding friends 918 in the entity table 304 which may include friends 918 social interaction data with member 1006, avatar data 1008, nickname 1004, and other information related to the member 914.

Data Communications Architecture

Figure 4:
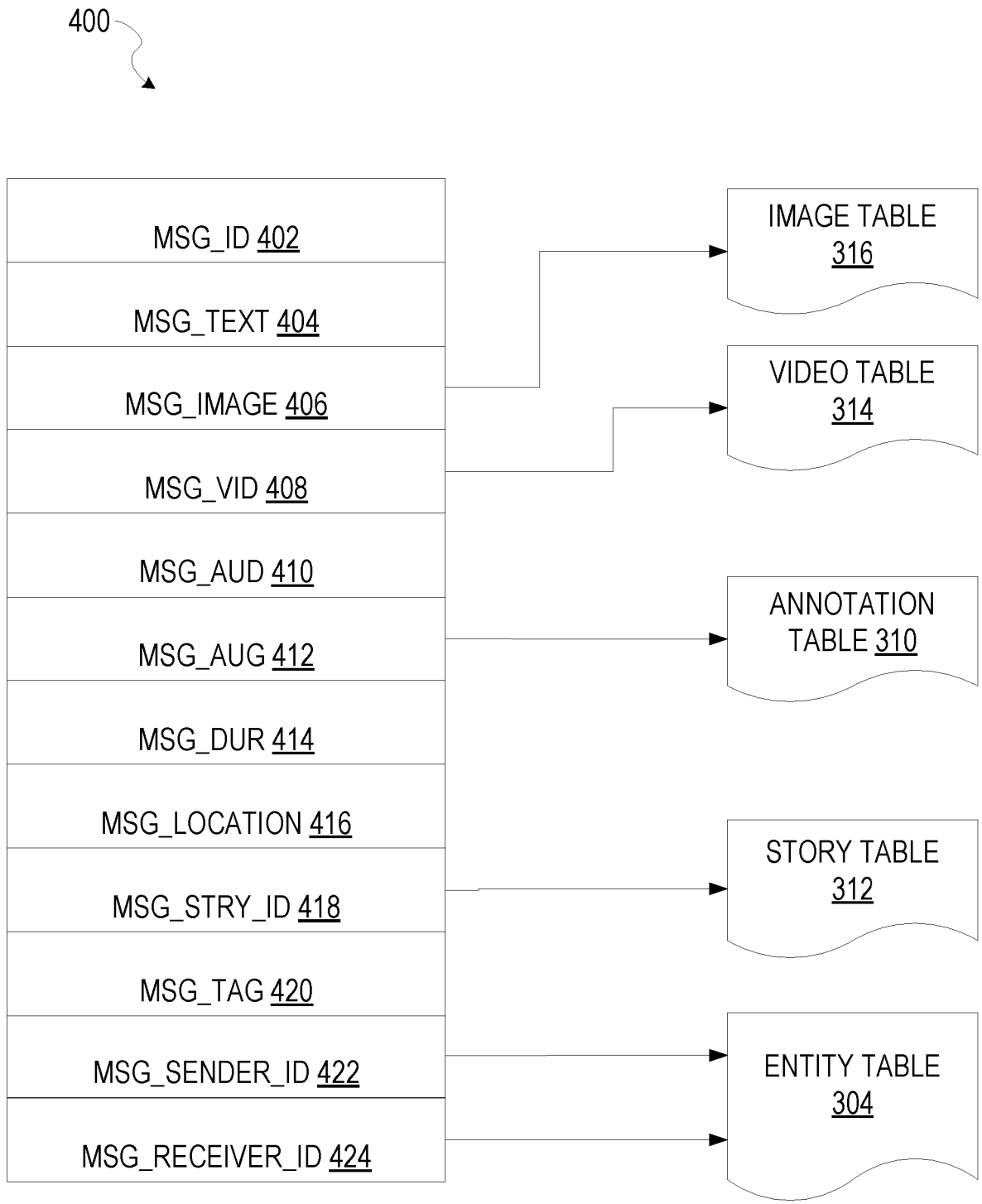
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402: a unique identifier that identifies the message 400. Message text payload 404: text, to be generated by a user via a user interface of the client device 102, and that is included in the message 400.

Message image payload 406: image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414: parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
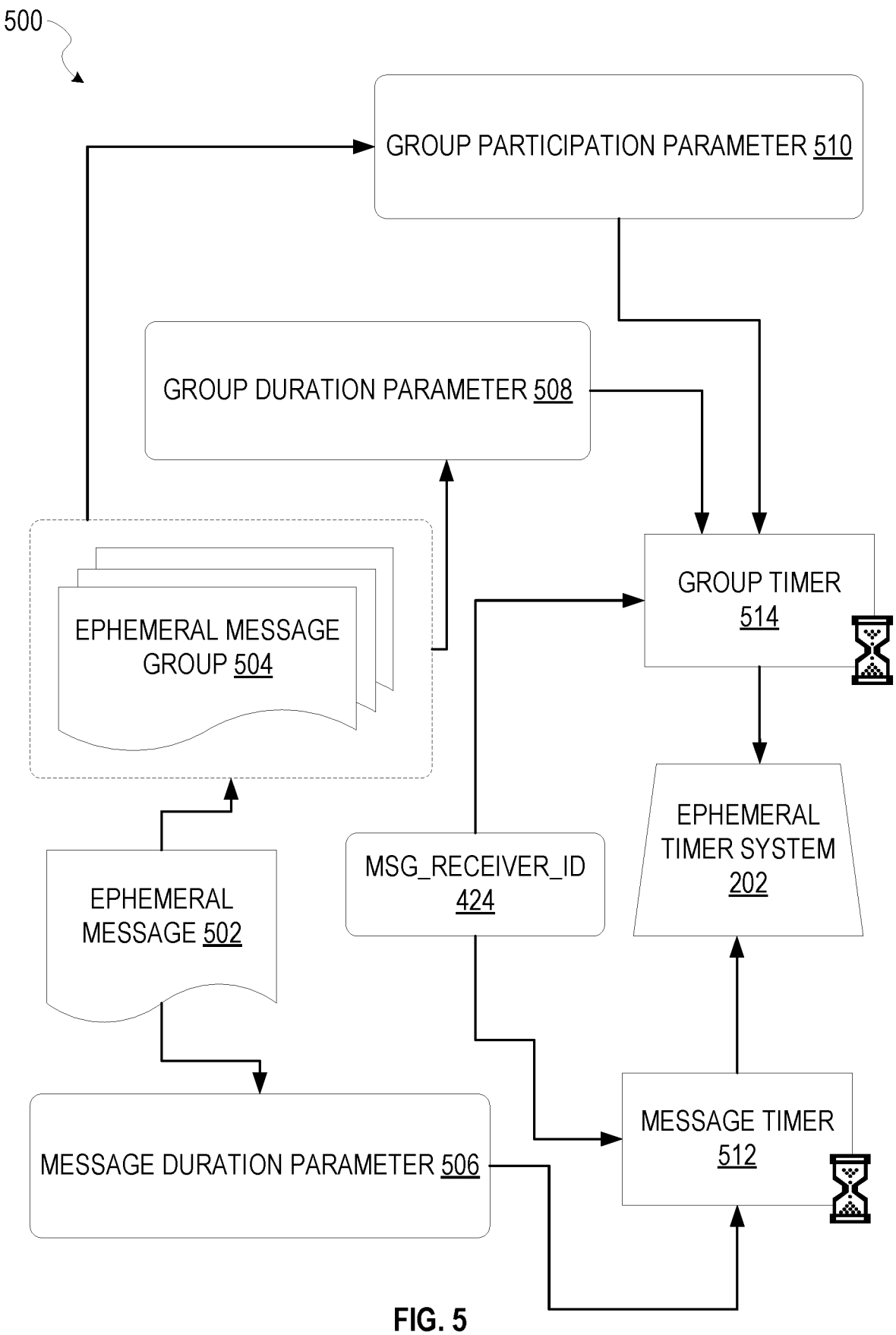
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Machine Architecture

Figure 6:
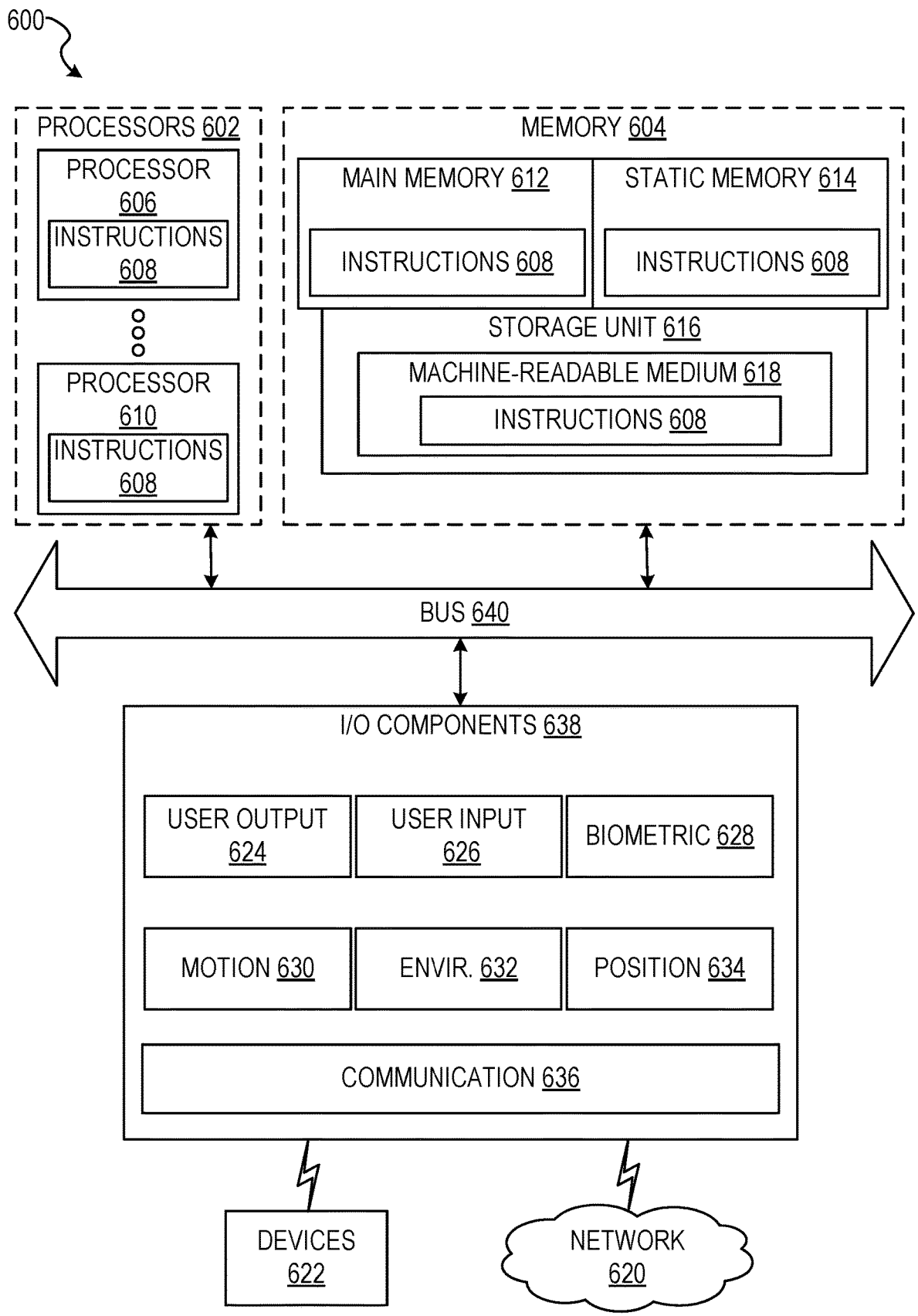
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 within which instructions 608 (e.g., software, a program, an application, an applet, an app, or other executable code) for causing the machine 600 to perform any one or more of the methodologies discussed herein may be executed. For example, the instructions 608 may cause the machine 600 to execute any one or more of the methods described herein. The instructions 608 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 608, sequentially or otherwise, that specify actions to be taken by the machine 600. Further, while only a single machine 600 is illustrated, the term "machine" shall also be taken to include a collection of machines that individually or jointly execute the instructions 608 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 602, memory 604, and input/output I/O components 638, which may be configured to communicate with each other via a bus 640. The processors 602 may be termed computer processors, in accordance with some examples. In an example, the processors 602 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 606 and a processor 610 that execute the instructions 608. The term "processor" is intended to include multi-core processors that may comprise two or more independent processors (sometimes referred to as "cores") that may execute instructions contemporaneously. Although FIG. 6 shows multiple processors 602, the machine 600 may include a single processor with a single-core, a single processor with multiple cores (e.g., a multi-core processor), multiple processors with a single core, multiple processors with multiples cores, or any combination thereof.

The memory 604 includes a main memory 612, a static memory 614, and a storage unit 616, both accessible to the processors 602 via the bus 640. The main memory 604, the static memory 614, and storage unit 616 store the instructions 608 embodying any one or more of the methodologies or functions described herein. The instructions 608 may also reside, completely or partially, within the main memory 612, within the static memory 614, within machine-readable medium 618 within the storage unit 616, within at least one of the processors 602 (e.g., within the Processor's cache memory), or any suitable combination thereof, during execution thereof by the machine 600.

The I/O components 638 may include a wide variety of components to receive input, provide output, produce output, transmit information, exchange information, capture measurements, and so on. The specific I/O components 638 that are included in a particular machine will depend on the type of machine. For example, portable machines such as mobile phones may include a touch input device or other such input mechanisms, while a headless server machine will likely not include such a touch input device. It will be appreciated that the I/O components 638 may include many other components that are not shown in FIG. 6. In various examples, the I/O components 638 may include user output components 624 and user input components 626. The user output components 624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 638 may include biometric components 628, motion components 630, environmental components 632, or position components 634, among a wide array of other components. For example, the biometric components 628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 630 include acceleration sensor components (e.g., accelerometer), gravitation sensor components, rotation sensor components (e.g., gyroscope).

The environmental components 632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 638 further include communication components 636 operable to couple the machine 600 to a network 620 or devices 622 via respective coupling or connections. For example, the communication components 636 may include a network interface Component or another suitable device to interface with the network 620. In further examples, the communication components 636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 622 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 612, static memory 614, and memory of the processors 602) and storage unit 616 may store one or more sets of instructions and data structures (e.g., software) embodying or used by any one or more of the methodologies or functions described herein. These instructions (e.g., the instructions 608), when executed by processors 602, cause various operations to implement the disclosed examples.

The instructions 608 may be transmitted or received over the network 620, using a transmission medium, via a network interface device (e.g., a network interface component included in the communication components 636) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 622.

Software Architecture

Figure 7:
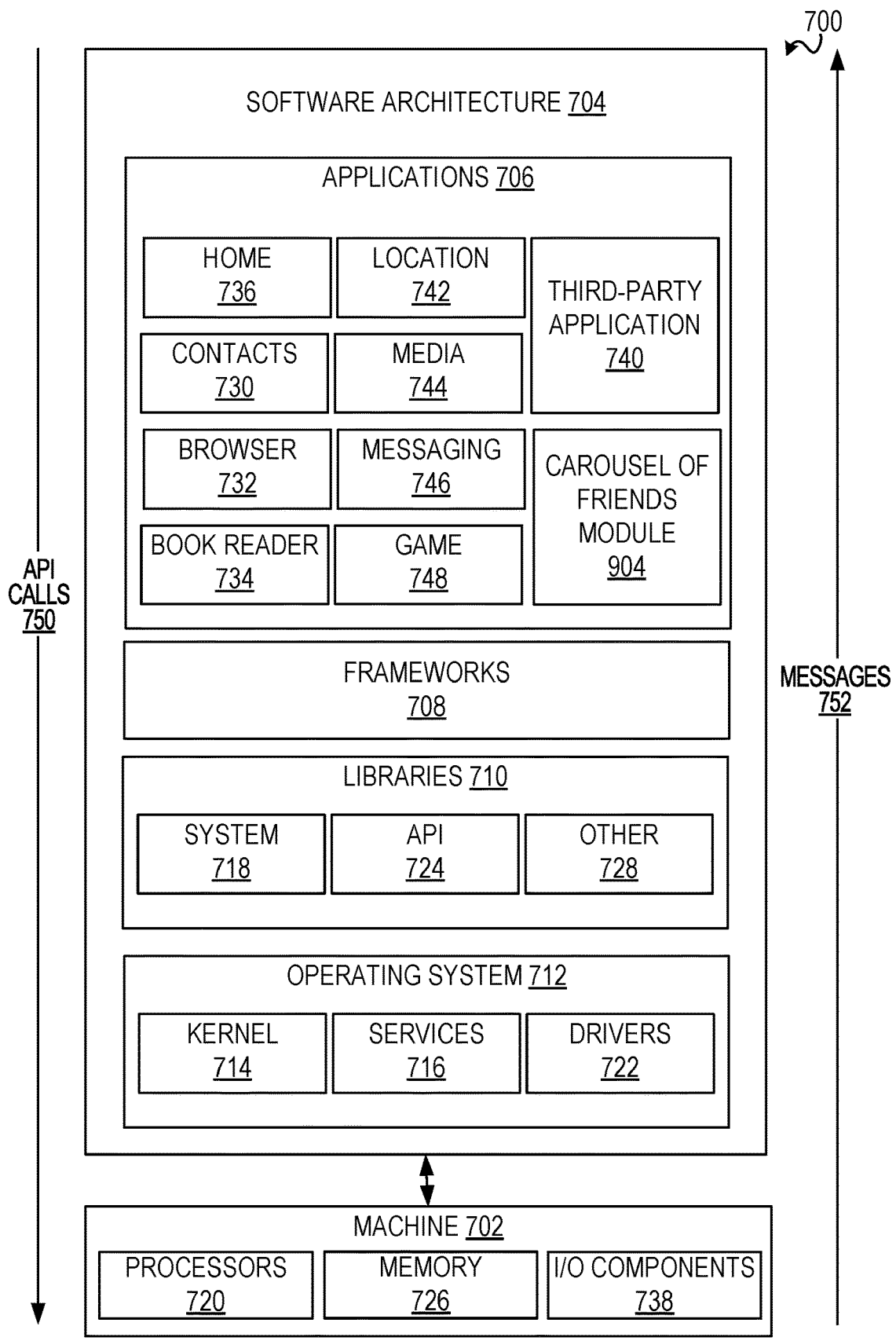
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a carousel module 904, a location application 742, a media application 744, a messaging application 746, a game application 748, and a broad assortment of other applications such as a third-party application 740. The carousel module 904 may be the same or similar as disclosed in conjunction with FIG. 9 and herein. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Messaging System with a Carousel

Figure 8:
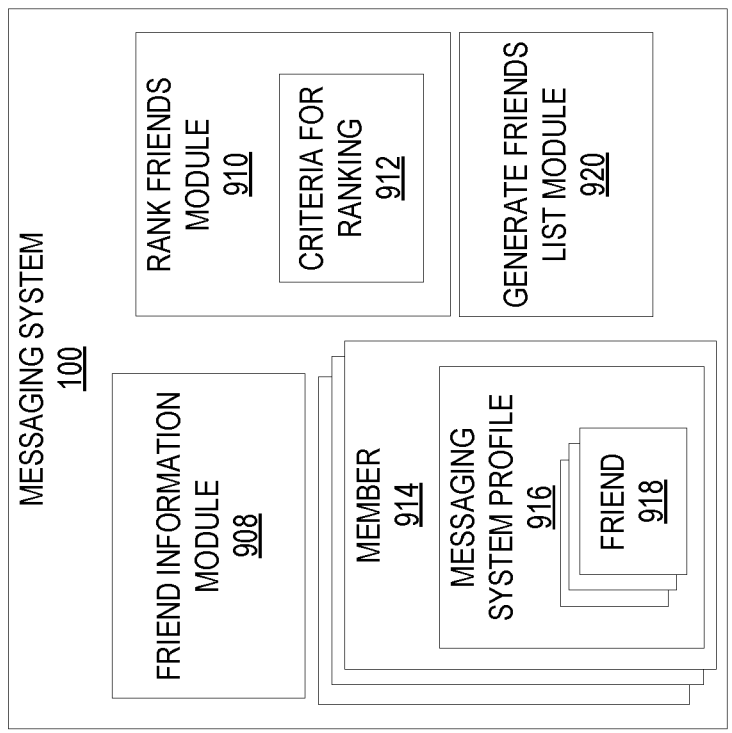
FIG. 8 illustrates a messaging system, in accordance with some examples.
Figure 11:
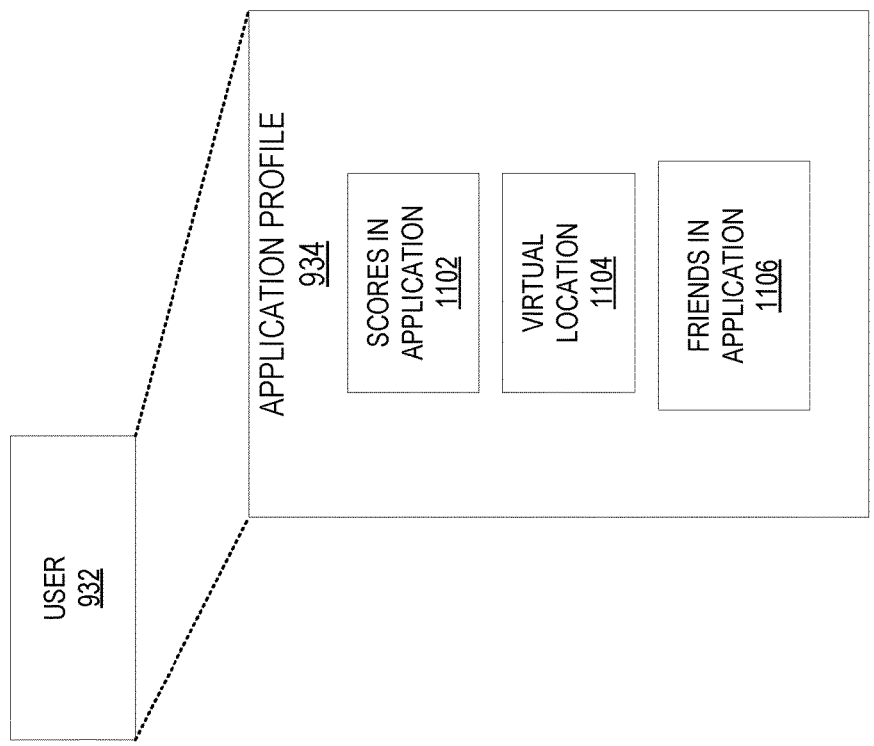
FIG. 11 illustrates an application profile, in accordance with some examples.

FIG. 8 illustrates a messaging system 100, in accordance with some examples. FIG. 9 illustrates a carousel system 900, in accordance with some examples. FIGS. 8 and 9 are disclosed in conjunction with one another. Illustrated in FIGS. 8 and 9 is messaging system 100, carousel module 904, and application module 906. The carousel module 904 causes to be displayed on a computing device friends 918 of a member 914 of a messaging system 100 for the member 914 within an application where the member 914 is a user 932 of the application implemented by application module 906. The messaging system 100 of FIGS. 8 and 9 is the same or similar as the messaging system 100 of FIG. 1. The carousel module 904 is the same or similar as the carousel module 904 of FIG. 7. The application module 906 is a third-party application 740 of FIG. 7, in accordance with some examples. The messaging system 100 of FIG. 8 includes friend information module 908, rank friends module 910, criteria for ranking 912, member 914, messaging system profile 916, friend 918, and generate friends list module 920. FIGS. 10 and 11 are disclosed in conjunction with FIG. 9.

FIG. 10 illustrates messaging system profile 916, in accordance with some examples. The member data regarding friend 1002 includes nickname 1004 and friend social interaction data with member 1006. The nickname 1004 is a name that is used for the friend 918 within the messaging system 100. Friend social interaction data with member 1006 is data regarding social interactions between the friend 918 and the member 914 such as messages 400 sent and received. An example friend social interaction is a message being sent between the friend 918 and the member 914. Avatar data 1008 is data that may be used to generate an avatar of the member 914. In an example, the avatar data 1008 is an emoji. Friends 918 are indications of member 914 that are friends with the member 914. The age 1010 indicates an age of the member 914. The gender 1012 indicates a gender of the member 914. The age group 1014 indicates an age group of the member 914 such as eighteen to thirty. The city 1016 indicates a city associated with the member 914. The language 1018 indicates a language associated with the member 914 such as Spanish or English. The country 1020 indicates a country associated with the member 914. Content consumed 1024 indicates content that was consumed by the member 914 within the messaging system 100. For example, content consumed 1024 includes messages 400 that were sent to the member 914 from a friend 918.

The name 1030 indicates a name of the member 914 such as a first name, middle name, and last name. The birthday 1032 indicates a birthday of the member 914. The scores in applications 1035 indicates scores the member 914 has received in applications such as third-party application 740 and such as is disclosed in conjunction with FIGS. 17-19. The geographic location 1034 indicates a geographic location of the member 914, which may be acquired from a mobile device of the member 914 or may be an estimated location based on other information associated with the member 914. The virtual location 1036 indicates a virtual location such as an application the member 914 is using or a location within an application the member 914 is using where the application includes virtual locations such as Mars. The messaging system profile 916 may include additional data fields. One or more of the data fields illustrated in messaging system profile 916 may be optional.

FIG. 11 illustrates an application profile 934, in accordance with some examples. The application profile 934 is associated with the application corresponding to the application module 906. The application profile 934 includes scores in application 1102, virtual location 1104, and friend in application 1106. The scores in application 1102 is a record of scores in the application such as a current score and past scores. The virtual location 1104 is a virtual location of the user 932 in the application such as Mars or a street location in a city within the application. The friends in application 1106 are friends of the user 932 within the application. A friend of friends in application 1106 is not necessarily a friend 918 within the messaging system 100 and vis-a-versa.

Returning to FIG. 9, the messaging system 100 includes friend information module 908, rank friends module 910, criteria for ranking 912, member 914, messaging system profile 916, friend 918, and generate friends list module 920. Member 914 may be a person that is using the client device 102 and is a member of the messaging system 100. Friend information module 908 may determine information regarding friends 918 of the member 914 such as geographic location 1034 or nickname 1004 of the friends 918 or other information from the messaging system 100 such as what is accessible via the messaging system profile 916. Friend information module 908 may be called by carousel module 904. The rank friends module 910 takes a list of friends generated by generate friends list module 920 and ranks the friends that are part of the list based on criteria for ranking 912. The criteria for ranking 912 may be based on friend social interaction data with member 1006 such a number of messages 400 the friend 918 and member 914 have exchanged. In another example, the criteria for ranking 912 may include multiple criteria such as a number of messages 400 and how recent the messages 400 have been exchanged.

Generate friends list module 920 generates a list of friends 925 for the member 914. Carousel module 904 may call the generate friends list module 920. Generate friends list module 920 determines the friends 918 based on explicit friend requests and acceptances, in accordance with some examples. In some examples, a member 914 send a friend request to another member 914 and when the other member 914 accepts the friend request, the two members 914 are determined to be two-way friends or just friends 918. In another example embodiment generate friends list module 920 determines friends 918 based on friend social interaction data with member 1006 where a member 914 is determined to be a friend 918 of another member 914 based on how much social interaction there is between the two members 914 where the amount of social interaction may be a fixed threshold or a relative threshold.

Carousel module 904 includes friends carousel rendering module 922, friends actions module 924, list of friends 925, avatar rendering module 926, friends status module 928, and friends application status module 930. In some examples, the carousel module 904 is code that is included within the application module 906 with functions provided by the carousel module 904 accessed using an application programming interface. In some examples carousel module 904 is a separate module that is called by the application module 906. The friends carousel rendering module 922 causes or provides information for a carousel that includes some or all of the list of friends 925 to be displayed on a computing device such as client device 102. The carousel may be scrollable to enable the user 932 to view each of the members 914 included in the list of friends 925.

The friends actions module 924 determines actions 929 that may be taken for friends 918 that are displayed in the list of friends 925. An example action 929 includes invite whereby a user 932 of the application can invite a friend 918 within the messaging system 100 to join the application. The list of friends 925 is one or more friends 918 that are generated by the generate friends list module 920. Avatar rendering module 926 causes or assists in rendering an avatar of a friend 918. For example, avatar rendering module 926 may retrieve avatar data 1008 for a friend 918 and send the avatar data 1008 to the application module 906 or may cause the avatar to be rendered using the avatar data 1008.

The notifications 927 are received from the application module 906 regarding actions of users 932 that can be communicated to member 914 that are part of the list of friends 925 of the member 914. The notifications 927 can be any type of information the application module 906 communicates such as a high score value, an active player notice, a request for joining the game notice, a message 400 that is to be sent using the messaging system 100, and so forth.

Friends status module 928 returns status information to the application module 906 regarding member 914 who are part of the list of friends 925 where the status information includes active within the messaging system 100, inactive, location unknown, location known, and so forth. Friends application status module 930 may determine the status of friends 918 of the list of friends 925 within the application corresponding to the application module 906. Each user 932 may have a separate copy of the application module 906 where for a multiuser application there may be a central server. A user 932 or application module 906 may request friends application status module 930 determine the status with the application for the members 914 that are part of the list of friends 925. In some examples there may be security issues that prevent the application module 906 for a user 932 determining the status of another user 932 of the application, but the carousel module 904 may be able to determine the status via the messaging system 100 and accessing the application module 906 for the user 932 on the client device 102 that the user 932 is running the application module 906 on.

The application module 906 includes user 932, application profile 934, reordered list of friends 935, access carousel module 936, application data 938, and reorder friends module 940. The user 932 is a user of the application corresponding to the application module 906. The application profile 934 is disclosed in conjunction with FIG. 11. The reorder friend module 940 takes the list of friends 925 and reorders them to add criteria for the application to generate the reordered list of friends 935. In an example, the criteria may be to reorder the list of friends 925 to place the friends who are playing the application first and the friends who are nearest to the user 932 according to the virtual location 1104 before other friends that are playing the application. In another example, the list of friends 925 may be reordered to put members 914 in the list of friends 925 who are also friends in application 1106 before members 914 who are not friends in application 1106.

In another example, the list of friends 925 may be reordered based on the scores in application 1102 with friends 918 with scores in application 1102 close to the scores in application 1102 of the user 932 having a higher rank in the reordered list of friends 935. The reorder friends module 940 may request information regarding application profile 934 of members 914 that are part of the list of friends 925 from the friends status module 928. The friends status module 928 may request the information from the messaging system 100 that then sends a request via another copy of the carousel module 904 running on another client device 102 for the information. Access carousel module 936 may perform interactions with the carousel in conjunction with the friends carousel rendering module 922 and friends actions module 924. For example, a user 932 may select an action 929 such as invite a friend 918 to play the application. Access carousel module 936 will request from friends actions module 924 that a message 400 be sent to the friend 918 within the messaging system 100. In another example, access carousel module 936 may request avatar data 1008 for the friends of the list of friends 925 for displaying the carousel.

The application module 906, carousel module 904, and/or messaging system 100 may be running on the client device 102 for one member 914 of the messaging system 100 and on another client device 102 for another member 914 of the messaging system 100. The application module 906 may need to request information regarding friends 918 of the list of friends 925 via the carousel module 904 and the messaging system 100 as the application module 906 may not have access to information regarding the members 914 of the list of friends 925. The carousel system 900 may have components that are part of the messaging client 104 and the application servers 112 and may request the information from the messaging system 100 regarding other members 914.

Figure 12:
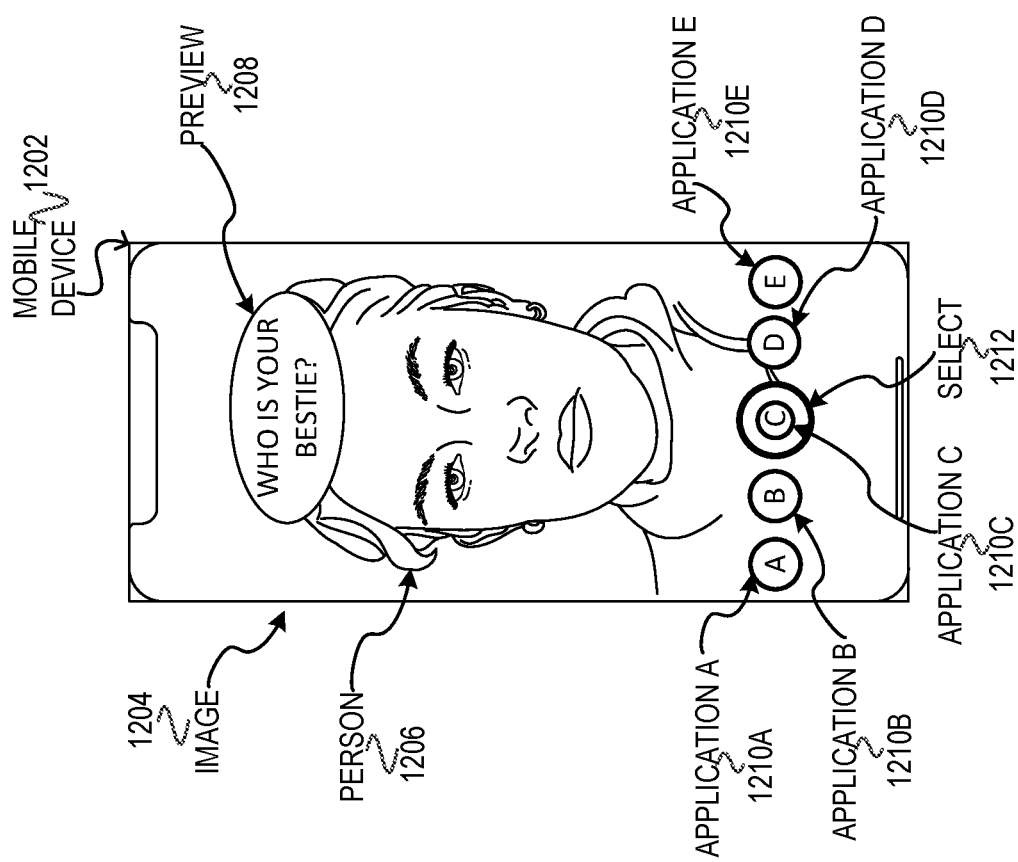
FIGS. 12, 13, and 14 illustrate an example application with a carousel of friends, in accordance with some examples.
Figure 13:
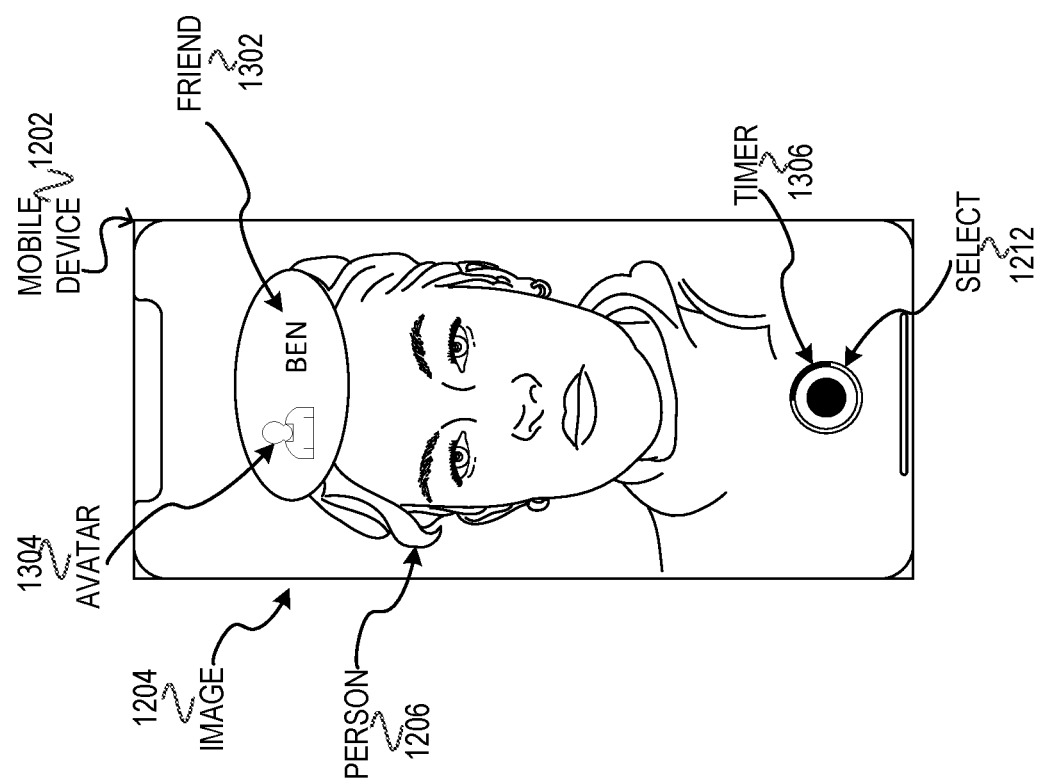
Figure 14:
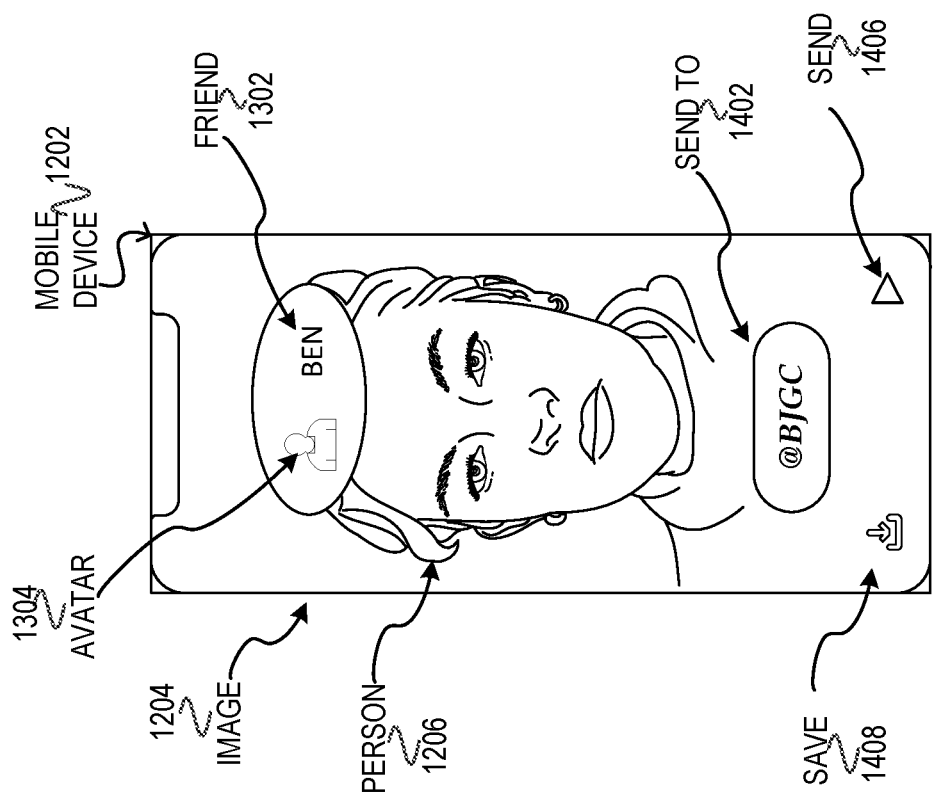

FIGS. 12, 13, and 14 illustrate an example application with a carousel, in accordance with some examples. Labels and numbers that are the same for FIGS. 12-22 are meant to indicate that the elements indicated by the labels and numbers are the same or similar as one another. Illustrated in FIG. 12 is mobile device 1202, image 1204, person 1206, preview 1208, application A 1210A, application B 1210B, application C 1210C, application D 1210D, application E 1210E, and select 1212. The mobile device 1202 is computing device such as client device 102. Image 1204 is a live image of person 1206 with a preview 1208 where the preview 1208 indicates what application C 1210C will do if the person 1206 selects application C 1210C to run by selecting select 1212. Application A 12010A, application B 1210B, application D 1210D, and application E 1210E are other applications. Select 1212 is a ring that when an application is within the ring, then a preview 1208 of the application appears in the image 1204.

FIG. 13 illustrates friend 1302, avatar 1304, and timer 1306. The person 1206 has selected select 1212 in FIG. 12 with application C 1210C and application C 1210C is running in FIG. 13. Application C 1210C receives a list of friends 925 and randomly selects a friend 918 from the list of friends 925 to display as friend 1302. Application C 1210C requests avatar data 1008 from carousel module 904 and displays the avatar 1304 using the avatar data 1008 of the friend 1302. Application C 1210C spins through the list of friends 925 randomly while the timer 1306 has time left. When the person 1206 releases the select 1212 or when the timer 1306 is out of time, then application C 1210C proceeds to FIG. 14.

Illustrated in FIG. 14 is send to 1402, send 1406, and save 1408. The image 1204 is frozen with a selection of a friend 1302 and an avatar 1304 of the friend 1302. Application C 1210C provides the person 1206 with the options of saving the image 1204 with save 1408 or sending the image by selecting send 1406. The person 1206 may select a member 914 of the messaging system 100 to send the image 1204. In FIGS. 12-14, the carousel is not explicitly displayed but a friend 918 is spun or randomly selected from the list of friends 925.

Figure 15:
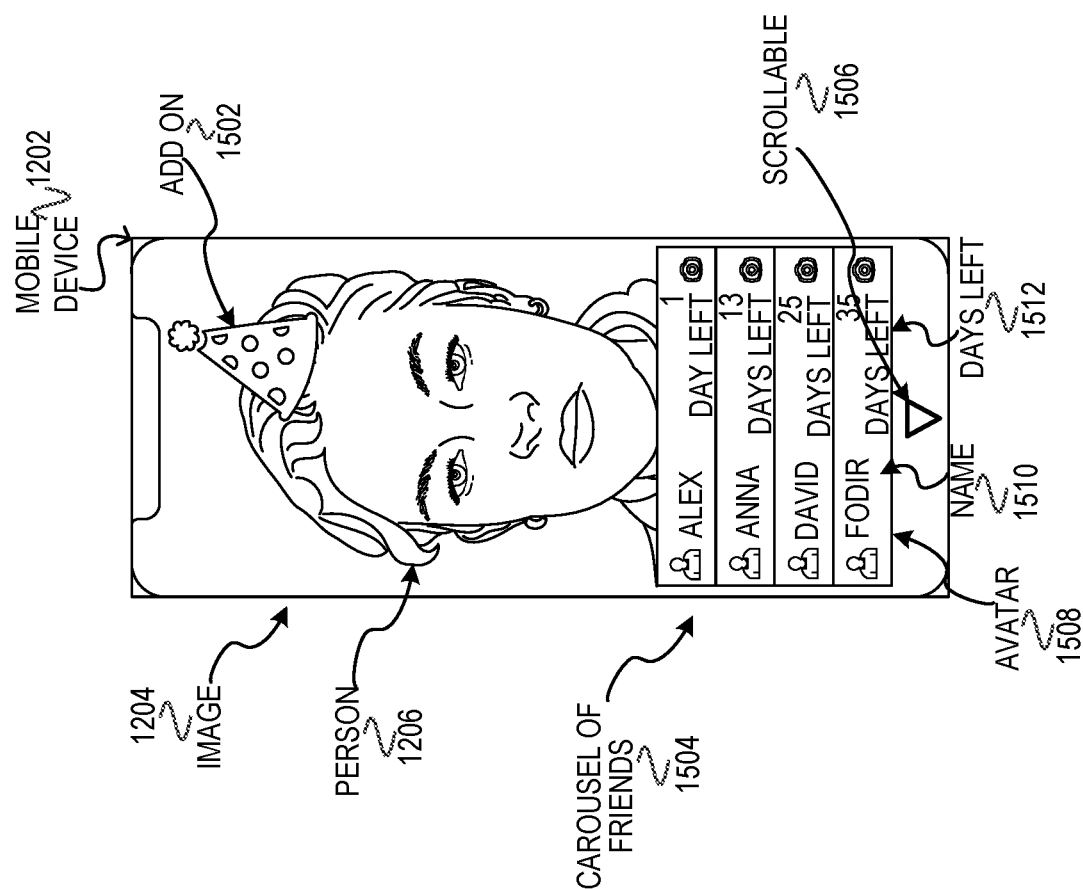
FIG. 15 illustrates an example application with a carousel, in accordance with some examples.

FIG. 15 illustrates an example application with a carousel 1504, in accordance with some examples. Illustrated in FIG. 15 add on 1502, carousel 1504, scrollable 1506, avatar 1508, name 1510, and days left 1512. The image 1204 is a live view image of the person 1206. The application sends a birthday wish to a friend 918 in the carousel 1504. The carousel 1504 is a partial list of the list of friends 925. The application uses friends actions module 924 to retrieve birthday 1032 information, nickname 1004, and avatar data 1008 for the friends 918 of the list of friends 925 that are being displayed in the carousel 1506. The nickname 1004 is used to display the name 1510. The avatar data 1008 is used to display the avatar 1508. And the carousel 1504 is reordered to generate the reordered list of friends 935 according to the birthday 1032 information and ordered by days left 1512 before the birthday 1032. The carousel 1504 is scrollable 1506 when the carousel 1504 is displaying fewer friends represented by the avatar 1508 than are in the list of friends 925 or reordered list of friends 935.

The person 1206 can record a birthday wish to a friend 918 in the carousel 1504 by selecting the friend 918. The application will then send the birthday wish, which may be a video, to the messaging system 100 such as by calling carousel module 904 or directly communicating with the messaging system 100. The messaging system 100 may hold the message 400 until the birthday 1032 of the friend 918 and then send a message 400 to the friend 918 with the birthday wish.

Figure 16:
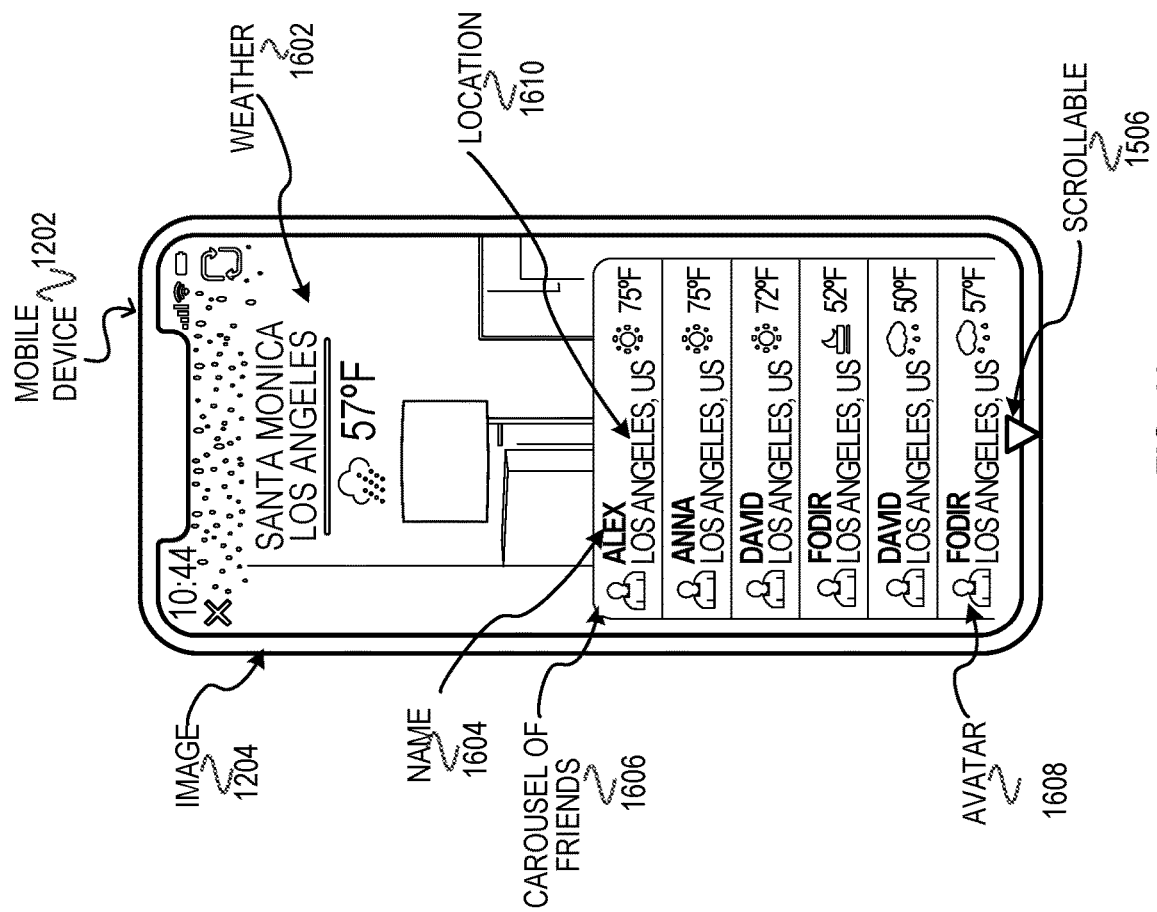
FIG. 16 illustrates an example application with a carousel of friends, in accordance with some examples.

FIG. 16 illustrates an example application with a carousel 1506, in accordance with some examples. A carousel 1606 is displayed that is scrollable 1506. The image 1204 indicates the weather 1602 for the location of the mobile device 1202. In some examples the application displays augmented reality images indicating the weather over a live image 1204. The application uses friends actions module 924 to retrieve geographic location 1034 information, nickname 1004, and avatar data 1008 for the friends 918 of the list of friends 925 that are being displayed in the carousel 1606. A person that is the user of the application may select a friend 918 of the carousel 1606 by touching the corresponding row of the carousel 1606. The friends 918 in the carousel 1606 may be displayed with avatars 1608. The application responds by showing the weather 1602 in the location 1610 of the friend 918, which may include augmented reality over a real time image 1204. In some examples, the image 1204 may be a real time image associated with the location 1610 such as a webcam.

Figure 17:
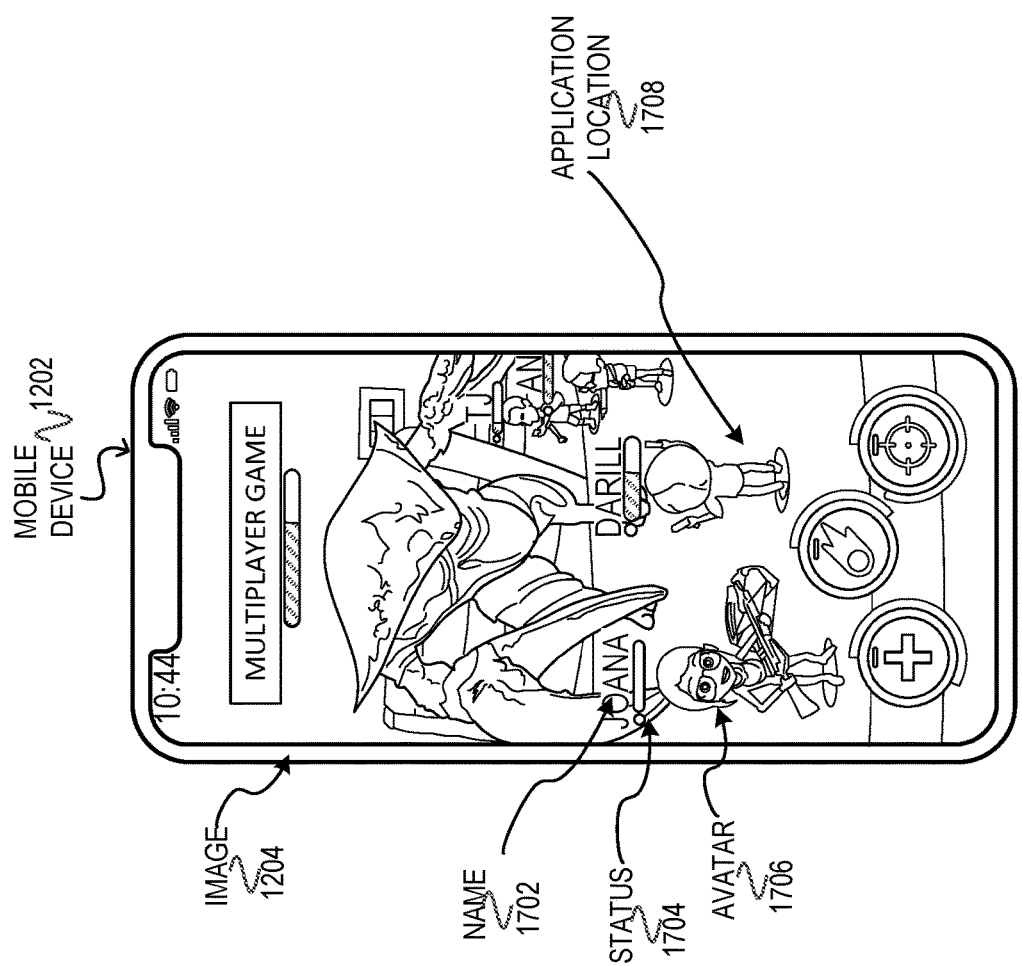
FIGS. 17, 18, and 19 illustrate an example application with a carousel of friends, in accordance with some examples.
Figure 18:
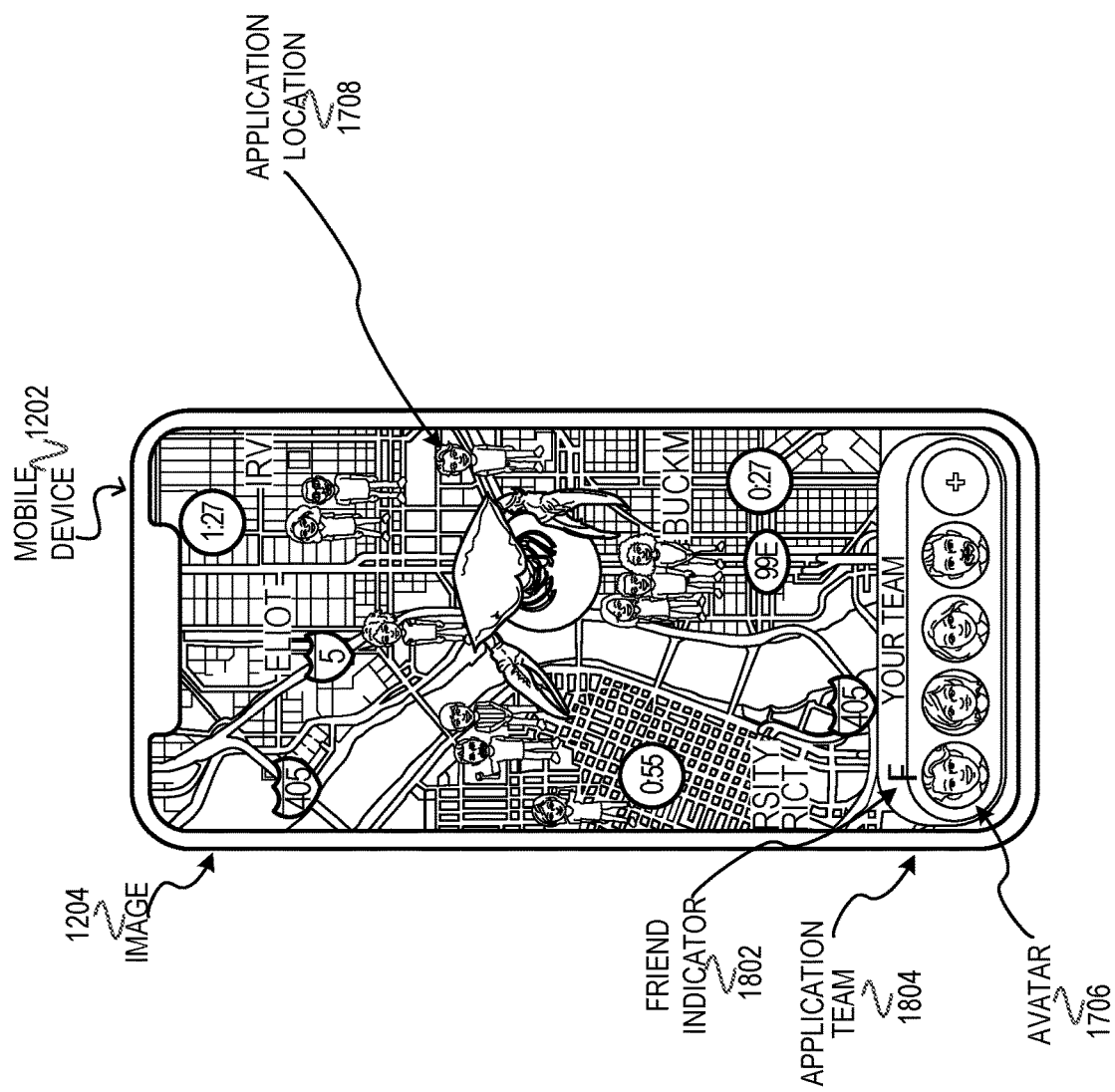
Figure 19:
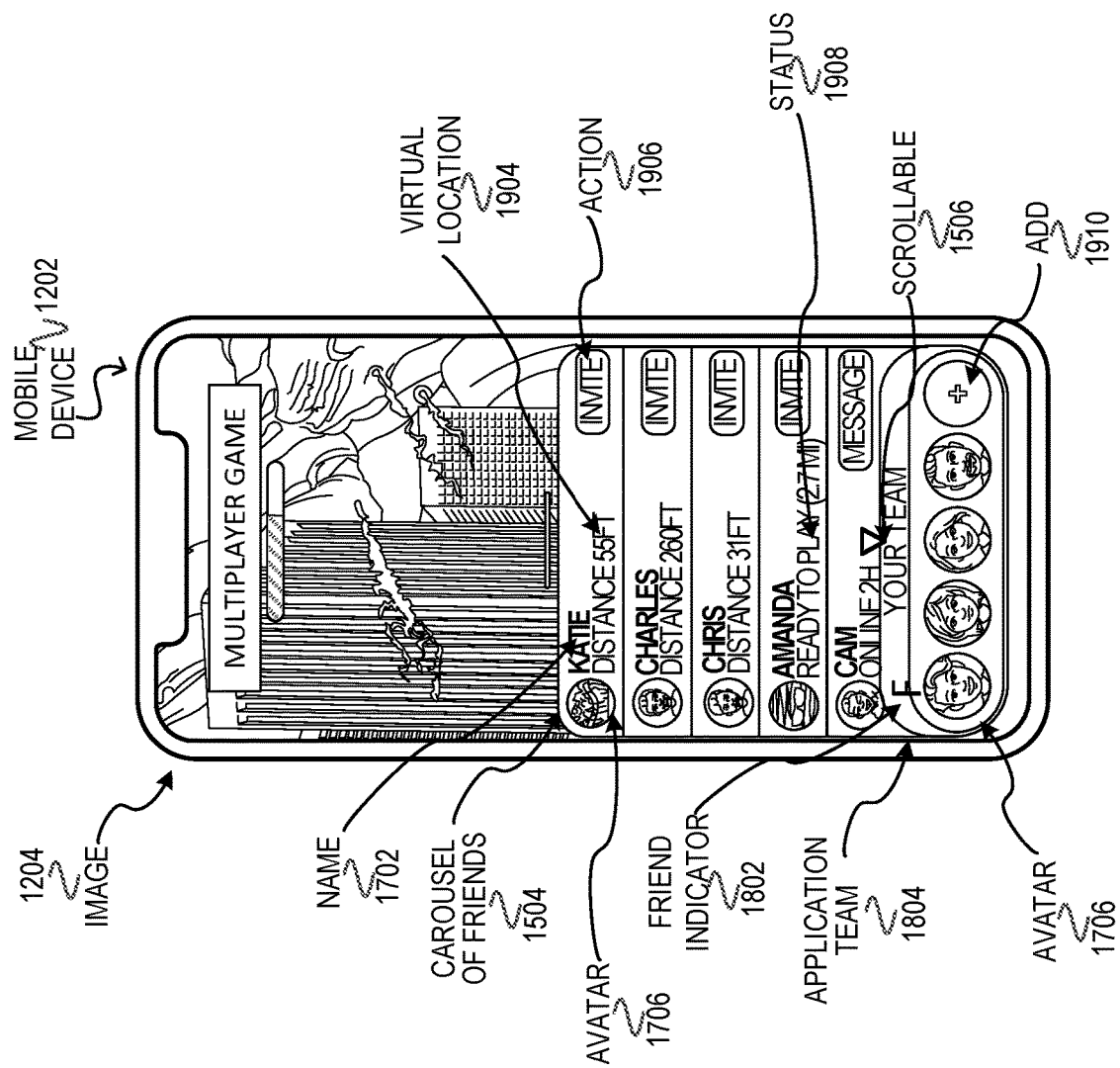

FIGS. 17, 18, and 19 illustrate an example application with a carousel, in accordance with some examples. Illustrated in FIG. 17 is name 1502, status 1704, avatar 1706, and application location 1708. The application is a multiplayer game. Image 1204 includes information about a user 932 of the application and other users 932.

The application uses friends actions module 924 to retrieve nickname 1004 and avatar data 1008 for the friends 918 of the list of friends 925. The application uses the nickname 1004 to display for the name 1702. The application uses the avatar data 1008 to display the avatar 1706. In some examples, the avatar 1706 may be a combination of avatar data 1008 from the messaging system profile 916 such as a face and avatar data from the application such as the body and/or weapon. The status 1704 may be application data 938. The application may determine which friends 918 of the list of friends 925 are also playing the application and use the information from the messaging system 100 to display the friends 918 such as the name 1702 and avatar 1706. Application location 1708 is application data 938 indicating a location of the user 932 with the application corresponding to the application module 906. In some examples the avatar 1706 may be the user 932 of the application and one or more of the other avatars may be friends 918 of the list of friends 925.

Illustrated in FIG. 18 is friend indicator 1802 and application team 1804. The application team 1804 illustrates team members within the application, which is application data 938. The application uses friends actions module 924 to avatar data 1008 for the friends 918 of the list of friends 925. The application determines whether a team member of the application team 1804 is a friend and should have a friend indicator 1802 by their avatar based on comparing application data 938 with the list of friends 925. In some examples the application data 938 includes a member 914 identification that is compared with the list of friends 925. The application uses the avatar data 1008 to display the avatar 1706. In some examples, the avatar 1706 may be a combination of avatar data 1008 from the messaging system profile 916 such as a face and avatar data from the application such as the body and/or weapon.

Illustrated in FIG. 19 is carousel 1504, virtual location 1904, action 1906, status 1908, and add 1910. FIG. 19 is displayed in response to the user 932 selecting add 1910. The carousel 1504 is a partial list of the list of friends 925. The application uses friends actions module 924 to retrieve virtual location 1904, status 1908, avatar data 1008, and nickname 1004 for the friends 918 of the list of friends 925 that are being displayed in the carousel 1504.

The retrieved nickname 1004 is used to display the name 1702. The avatar data 1008 is used to display the avatar 1706. The application module 906 uses reorder friends module 940 to generate reordered list of friends 935 where the reordering is based on the virtual location 1904 and status 1908 in order to place friends 918 that are active and near the user 932 at the top of the carousel 1504. The carousel is displaying the friends 918 that ranked highest in the reordered list of friends 935. The friends 918 that ranked higher or highest may be termed top performers, in accordance with some embodiments.

The virtual location 1904 may be a virtual location 1104 within the application. The carousel 1504 includes an action 1906 to invite a friend 918 of the carousel 1504. The action 1906 may be an action 929. The application may call friends status module 928 to retrieve status information for the friends 918 of the list of friends 925 where in this case the status 1908 may include whether they are ready to play, playing (indicated by a distance), or online. A status 1908 of "online" of a friend 918 indicates the friend 918 is within the messaging system 100, but not running the application. A status 1908 of "ready to play" may indicate that the friend 918 is within the application or within the messaging system 100. A status 1908 that indicates a distance from the user 932 such as "Distance 55 ft" indicates the friend 918 is active within the game and is 55 feet from the user 932 within the application. A status 1908 may be determined using friends application status module 930 as well a status within the messaging system 100.

Action 1906 may be an action of actions 929. Actions 1906 may be actions that may be performed with the application or action that may be performed within the messaging system 100. As illustrated "invite" may be an action 1906 within the application that sends an invitation to the friend 918 to join a team or become active with the user 932 of the application. As illustrated "message" may be an action 1906 that sends a message 400 using the messaging system 100 to the friend 918. In some examples, "invite" may be a message 400 sent via the messaging system 100 that includes a hotlink for the friend 918 to join a team of the user 932 within the application.

In some examples, additional actions 1906 may be displayed. In some examples, actions 1906 is listed as a menu enabling more than one action. For example, the user 932 may be given the option to send a message 400 to the friend 918 or to use the application to communicate with the friend 918. The carousel 1504 is scrollable 1506 when the carousel 1504 is displaying fewer friends as represented by avatar 1508 than are in the list of friends 925 or the reordered list of friends 935.

Figure 20:
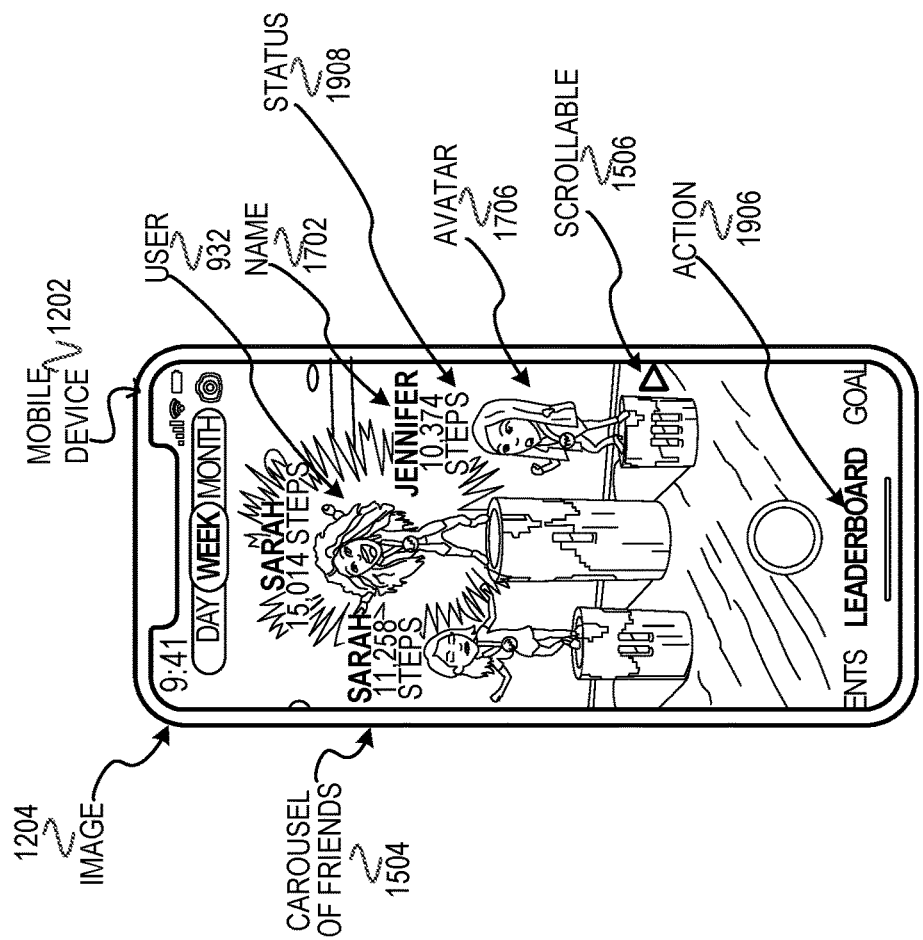
FIGS. 20, 21, and 22 illustrate an example application with a carousel of friends, in accordance with some examples.
Figure 21:
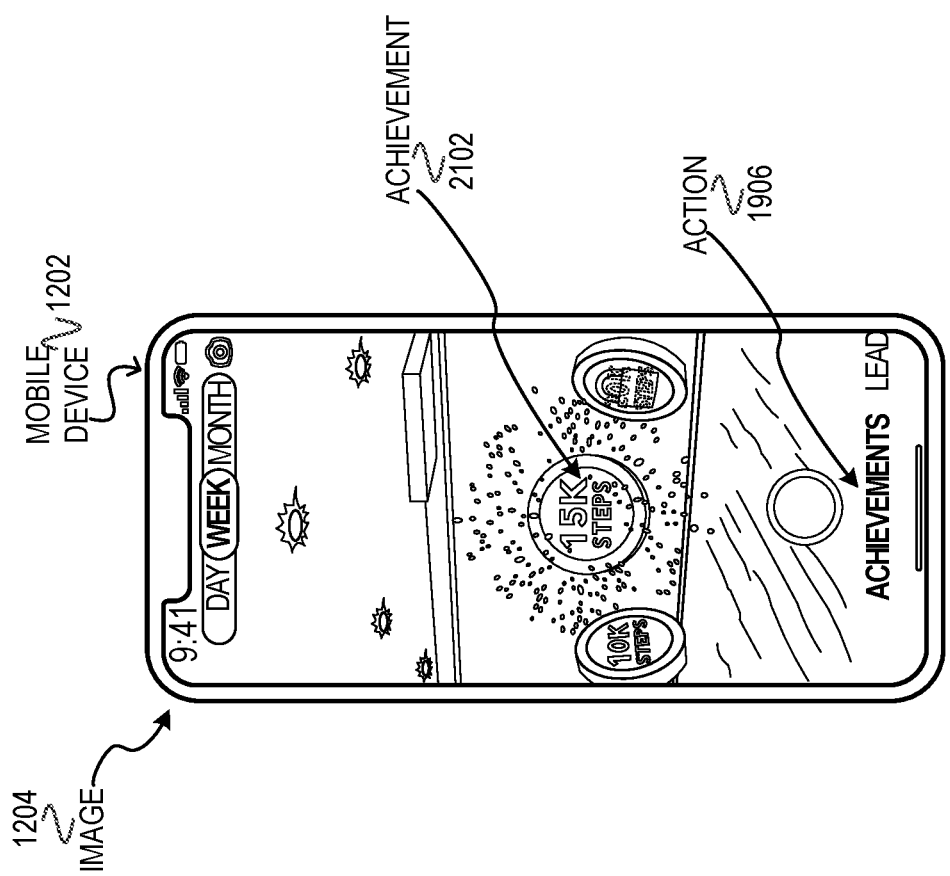
Figure 22:
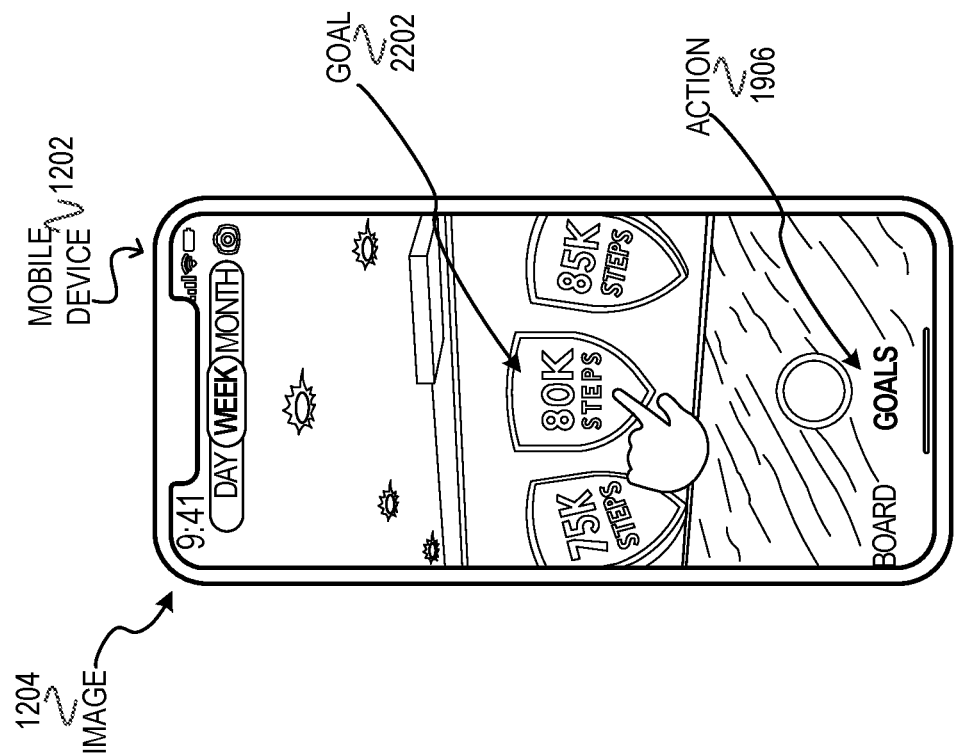

FIGS. 20, 21, and 22 illustrate an example application with a carousel, in accordance with some examples. Illustrated in FIG. 20 is an image 1204 of an application implemented with an application module 906. The user 932 has selected an action 1906 of "leaderboard", which may determine a list of friends 925 for the user 932 and then generate the reordered list of friends 935 using reorder friends module 940 based on application data 938 of friends 918. The application uses friends actions module 924 to retrieve status 1908, avatar data 1008, and nickname 1004 for the friends 918 of the reordered list of friends 935 that are being displayed. The friends 918 being displayed may be a carousel 1504 that is scrollable. The carousel module 904 may display the carousel 1504 or provide information to the application for displaying the carousel 1504. Name 1702 of "Jennifer" is a friend 918 of the carousel 1504. Her position as third is determined based on her status 1908 of "9,374 steps."

In some examples, actions 929 associated with the friends 918 are displayed such as message, invite to another application, invite to set a goal, and so forth. Illustrated in FIG. 21 is achievement 2102 that indicates an achievement 2102 of "15K steps" by the user 932 and/or friends 918 of the user 932. The image 1204 displayed is from the application. The action 1906 selected by the user 932 of the application is "achievements" for a time period of "week". Illustrated in FIG. 22 is goal 2202 where the action 1906 selected is "goals". The image 1204 displayed is from the application. In some examples, a popup window is displayed that gives the option of sending a message 400 to friends of the carousel 1504 to communicate the goal 2202.

FIG. 23 illustrates a method 2300 for a carousel, in accordance with some examples. The method 2300 begins at operation 2302 with a carousel module accessing a list of related entities of a user of an application, the list of related entities indicating related entities of the user within a messaging system, where the related entities list is ordered based on interactions of the related entities of the list of related entities with the user within the messaging system. For example, referring to FIG. 9, the carousel module 904 accesses the friends 918 of the member 914 from within a messaging system 100. The carousel module 904 may generate list of friends 925 that are ordered based on friend social interaction date with member 1006 of FIG. 10.

The method 2300 continues at operation 2304 with causing a carousel of the list of related entities to be displayed for the user on a computing device, the carousel being scrollable. For example, carousel 1504 is displayed in FIG. 19. Friends carousel rendering module 922 of FIG. 9 may aid in the displaying of the carousel 1504.

The method 2300 continues at operation 2306 with causing a status within the application of the related entities of the carousel to be displayed on the computing device. For example, referring to FIG. 19, the status 1908 indicates whether the friend is playing the multiplayer game, which is the application, or not. The status 1908 may indicate information that is related to the application such as how close a friend is to the user such as a virtual location 1904. The carousel module 904 may provide information to the application module 906 that is displayed that normally would not be available to the user 932 of the application regarding other users 932 when they are also friends 918 within the messaging system 100. For example, the virtual location may not be available to a user 932 of the multiplayer game of FIG. 19, but the messaging system 100 may access virtual location 1036 from the messaging system profile 916 of the user 932.

Method 2300 may include one or more additional operations. The operations of method 2300 may be performed in a different order. One or more operations of method 2300 may be optional.

Optionally, the method 2300 includes reordering the list of related entities based on interactions of the related entities with the user within the application to generate a reordered list of related entities and causing the carousel of the reordered list of related entities to be displayed for the user on the computing device. For example, referring to FIGS. 9 and 19, reorder friends module 940 may use information from within the game such as virtual location 1904 to generate reordered list of friends 935 from the list of friends 925.

Optionally, the method 2300 includes the carousel comprises two to nine related entities of the list of related entities, and wherein a special relation entity of the list of related entities is displayed on a left portion of the carousel. For example, referring to FIG. 16, the carousel 1606 may be limited to based on the display size of the mobile device 1202. Additionally, a best or closest friend from the messaging system 100 may be displayed at top or left portion of the carousel 1606 such as name 1604 may be a best or closest friend to the user of the application regarding weather.

Optionally, the method 2300 includes accessing profiles of the list of related entities from the messaging system and causing the carousel of the list of related entities to be displayed for the user on a computing device, wherein the related entities of the list of related entities are displayed with one or more fields of the profiles. For example, referring to FIGS. 9, 10, and 17, avatar 1706 may be rendered at least partially from avatar data 1008 by avatar rendering module 926 of carousel module 904.

Optionally, the method 2300 includes accessing profiles of the list of related entities from the messaging system, reordering the list of related entities based on a field of the profiles of the list of related entities, and causing the carousel of the reordered list of related entities to be displayed for the user on a computing device. For example, referring to FIGS. 9, 10, and 15, the carousel 1504 is displayed with friends reordered based on "day left" until a birthday of the friend 918. Reorder friends module 940 may take the list of friends 925 and generate reordered list of friends 925 based on birthday 1032.

Optionally, the method 2300 includes accessing nicknames of the list of related entities from the messaging system, randomly selecting a friend of the list of related entities, and causing to be displayed on the computing device that is displaying a live image of the user a nickname of the nicknames of the randomly selected entity, wherein the nickname is displayed above a head of the user. For example, referring to FIG. 13, a random friend 1302, "Ben", is selected from the list of friends 925 of FIG. 9, and displayed above an image 1204 of the person 1206 in a live image.

Optionally, the method 2300 includes accessing information representing the randomly selected entity from the messaging system and causing to be displayed on the computing device a representation of the information as augmented reality with the user of the application. For example, referring to FIG. 14, the avatar 1304 may be displayed with the person 1206 who is the user of the application where the avatar 1304 is displayed based on avatar data 1008.

Optionally, the method 2300 includes in response to a selection of an entity of the list of related entities, accessing a location of the entity from the messaging system, and causing to be displayed on the computing device an image indicating weather conditions for the location. For example, referring to FIGS. 10 and 16, a user 932 of the application of FIG. 16, may select a friend 918 from the carousel 1606. The location of the friend 918 is retrieved from the messaging system 100 such as from geography location 1034, which may be retrieved from a location of the client device 102 of the friend 918. The weather conditions may be displayed on a live image of the mobile device 1202 such as rain within the room.

Optionally, the method 2300 includes in response to a selection of an entity of the list of related entities, causing a message to be sent by the messaging system to the entity with an invitation comprising a hotlink for the friend to run the application. For example, a selection of action 1906 of "invite" of FIG. 19, will cause a message 400 from the messaging system 100 to be sent to the friend 918 who corresponds to a member 914 of the messaging system 100.

Optionally, the method 2300 includes where the application is a multiplayer interactive application, and where the method further includes filtering the list of related entities to include related entities of the list of related entities that are running the application to generate a filtered list of related entities, causing a carousel of the list of filtered related entities to be displayed for the user on a computing device, and causing application status information to be displayed for the related entities of the list of filtered related entities. For example, reorder friends module 940 may filter friends 918 from the list of friends 925 to include friends that are active in the multiplayer game of FIG. 19.

Optionally, the method 2300 includes causing a request to be sent to the messaging system requesting information indicating that the related entities of the list of related entities are running the application. For example, access friends status module 928 may be called from the application of FIG. 19 to determine which of the friends 918 of the list of friends 925 are active within the application.

Optionally, the method 2300 includes causing to be displayed a geographic area of the application on the computing device, accessing location information for the filtered list of related entities, and displaying indications of the locations of related entities of the filtered list of related entities that are within the geographic area. Referring to FIG. 18, application location 1708 may be used to determine that a friend is within a geographic region that is displayed within the application. An indication that player is a friend may be a friend indicator 1802, the use of a nickname 1004, the use of avatar data 1008, and so forth.

Optionally, the method 2300 includes accessing avatar information for the filtered list of friends from the messaging system and where the indications are corresponding avatar information. For example, the application may use carousel module 904 to access avatar data 1008.

Optionally, the method 2300 includes accessing avatar information for the filtered list of related entities from the messaging system and where the indications are corresponding avatar information. For example, as illustrated in FIG. 20, performance information is included in the status 1908 and the friends of the carousel 1504 are ordered based on the performance information.

Optionally, the method 2300 includes in response to receiving an indication that the user requested the carousel be displayed, causing the carousel of the list of friends to be displayed for the user on the computing device. For example, as illustrated in FIG. 19, a user of the multiplayer game selected add 1910, which caused the carousel 1504 to be displayed.

Optionally, the method 2300 includes where the application is executed by a portion of the messaging system within an interpreter, and wherein the method includes in response to a selection by the user to end the application, causing control to be returned to the messaging system. For example, the multiplayer game of FIG. 19 may be a third-party application 740 that is interpreted via the messaging system 100 so that when the multiplayer game is terminated control returns to the messaging system 100.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 602 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
a carousel component, using at least one processor, accessing a list of related entities associated with a user running an application, the list of related entities indicating related entities of the user within a messaging system, wherein the related entities list is ordered based on a number of interactions of the related entities of the list of related entities with the user within the messaging system, wherein the application and the carousel component are executed by an interpreter running on a computing device;

filtering the list of related entities to include related entities of the list of related entities that are running the application to generate a filtered list of related entities;

causing a scrollable carousel comprising the filtered list of related entities to be displayed on the computing-device over a displayed screen of the application;

causing to be displayed a geographic area of the application on the computing device;

accessing location information for the filtered list of related entities;

causing indications of the locations of related entities of the filtered list of related entities that are within the geographic area to be displayed; and in response to a selection of an entity of the filtered list of related entities, causing a message to be sent to the messaging system across a wireless link, the message causing the messaging system to send to the entity an invitation comprising a hotlink for the entity to perform an action within the application, wherein the messaging system resides on a server computer.

2. The method of claim 1 further comprising:
reordering the filtered list of related entities based on interactions of the related entities with the user within the application to generate a reordered list of related entities; and
causing the carousel of the reordered list of related entities to be displayed for the user on the computing device.

3. The method of claim 1 wherein the carousel comprises two to nine related entities of the filtered list of related entities, and wherein a special relation entity of the filtered list of related entities is displayed on a left portion of the carousel.

4. The method of claim 1 further comprising:
accessing profiles of the filtered list of related entities from the messaging system; and
causing the carousel of the filtered list of related entities to be displayed for the user on a computing device, wherein the related entities of the filtered list of related entities are displayed with one or more fields of the profiles.

5. The method of claim 1 further comprising:
accessing profiles of the list of related entities from the messaging system;
reordering the filtered list of related entities based on a field of the profiles of the filtered list of related entities; and
causing the carousel of the reordered filtered list of related entities to be displayed for the user on a computing device.

6. The method of claim 1 further comprising:
accessing nicknames of the list of related entities from the messaging system;
randomly selecting a friend of the filtered list of related entities; and
causing to be displayed on the computing device that is displaying a live image of the user a nickname of the nicknames of the randomly selected entity, wherein the nickname is displayed above a head of the user.

7. The method of claim 6 further comprising:
accessing information representing the randomly selected entity from the messaging system; and
causing to be displayed on the computing device a representation of the information as augmented reality with the user of the application.

8. The method of claim 1 further comprising:
in response to a selection of an entity of the filtered list of related entities,
accessing a location of the entity from the messaging system, and
causing to be displayed on the computing device an image indicating weather conditions for the location.

9. The method of claim 1 further comprising:
causing a request to be sent to the messaging system requesting information indicating that the related entities of the filtered list of related entities are running the application.

10. The method of claim 1 further comprising:
accessing avatar information for the filtered list of related entities from the messaging system; and
wherein the indications are corresponding avatar information.

11. The method of claim 1 further comprising:
accessing performance information indicating performance of the related entities of the filtered list of related entities within the application;
selecting top performers of the list of related entities using the performance information; and
causing indications of the top performers and the user to be displayed on the computing device.

12. The method of claim 1 further comprising:
in response to receiving an indication that the user requested the carousel be displayed, causing the carousel of the filtered list of related entities to be displayed for the user on the computing device.

13. The method of claim 1 further comprising:
causing a status within the application of the related entities of the carousel to be displayed on the computing device.

14. The method of claim 1 wherein the related entities of the list of related entities that are running the application are not friends with the user within the application.

15. A system comprising:
one or more computer processors; and
one or more computer-readable mediums storing instructions that, when executed by the one or more computer processors, cause the system to perform operations comprising:
a carousel component, using at least one processor, accessing a list of related entities associated with a user running an application, the list of related entities indicating related entities of the user within a messaging system, wherein the related entities list is ordered based on a number of interactions of the related entities of the list of related entities with the user within the messaging system, wherein the application and the carousel component are executed by an interpreter running on a mobile device and wherein the messaging system;
filtering the list of related entities to include related entities of the list of related entities that are running the application to generate a filtered list of related entities;
causing a scrollable carousel comprising the filtered list of related entities to be displayed on the mobile device over a displayed screen of the application;
causing to be displayed a geographic area of the application on the mobile device;
accessing location information for the filtered list of related entities;
causing indications of the locations of related entities of the filtered list of related entities that are within the geographic area to be displayed; and in response to a selection of an entity of the filtered list of related entities, causing a message to be sent to the messaging system across a wireless link, the message causing the messaging system to send to the entity an invitation comprising a hotlink for the entity to perform an action within the application, wherein the messaging system resides on a server computer.

16. The system of claim 15, wherein the instructions further cause the system to perform operations comprising:
reordering the filtered list of related entities based on interactions of the related entities with the user within the application to generate a reordered list of related entities; and
causing the carousel of the reordered list of related entities to be displayed for the user on the computing device.

17. The system of claim 15, wherein the carousel comprises two to nine related entities of the filtered list of related entities, and wherein a special relation entity of the list of related entities is displayed on a left portion of the carousel.

18. A non-transitory computer-readable storage medium including instructions that, when processed by a computer, configure the computer to perform the method of claim 1.

\* \* \* \* \*